(12) United States Patent
Cao et al.

(10) Patent No.: US 12,219,240 B2
(45) Date of Patent: Feb. 4, 2025

(54) EXPOSURE PARAMETER ADJUSTMENT METHOD, DEVICE AND STORAGE MEDIUM

(71) Applicant: Honor Device Co., Ltd., Shenzhen (CN)

(72) Inventors: Hepu Cao, Shenzhen (CN); Jingwei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 44 days.

(21) Appl. No.: 18/023,502

(22) PCT Filed: May 10, 2022

(86) PCT No.: PCT/CN2022/091957
§ 371 (c)(1),
(2) Date: Feb. 27, 2023

(87) PCT Pub. No.: WO2023/015992
PCT Pub. Date: Feb. 16, 2023

(65) Prior Publication Data
US 2023/0319393 A1    Oct. 5, 2023

(30) Foreign Application Priority Data

Aug. 9, 2021  (CN) .......................... 202110909669.2

(51) Int. Cl.
*H04N 23/611* (2023.01)
*G06T 7/223* (2017.01)
(Continued)

(52) U.S. Cl.
CPC ........... *H04N 23/611* (2023.01); *G06T 7/223* (2017.01); *H04N 23/71* (2023.01); *H04N 23/72* (2023.01);
(Continued)

(58) Field of Classification Search
CPC ...... H04N 23/611; H04N 23/71; H04N 23/72; H04N 23/73; H04N 23/76; H04N 23/635;
(Continued)

(56) References Cited

U.S. PATENT DOCUMENTS 10,437,972 B2 * 10/2019 Tang ........................ G06F 21/31
2014/0348399 A1 * 11/2014 Kuo ..................... G06V 40/172
382/118

(Continued)

FOREIGN PATENT DOCUMENTS

CN      104994306 A    10/2015
CN      105516589 B     7/2018
(Continued)

*Primary Examiner* — Mekonnen D Dagnew
(74) *Attorney, Agent, or Firm* — Leydig, Voit & Mayer, Ltd.

(57) ABSTRACT

This application provides an exposure parameter adjustment method, device, and storage medium. The method includes: obtaining a face box of a first-frame image and a second-frame image, where the face box of the first-frame image is used to indicate a region of a face in the first-frame image, and the second-frame image is a next-frame image of the first-frame image; correcting the face box of the first-frame image to obtain a second-face box; cropping the second-frame image based on the second-face box to obtain a face image of the second-frame image; and adjusting an exposure parameter based on the face image of the second-frame image. In this solution, a face box of a previous-frame image is first corrected, then a face image is cropped by using the second-face box, so that a face image obtained through cropping and an actual face region in an image that is cropped are consistent.

19 Claims, 15 Drawing Sheets

(51) Int. Cl.
*H04N 23/71* (2023.01)
*H04N 23/72* (2023.01)
*H04N 23/73* (2023.01)
*H04N 23/76* (2023.01)

(52) U.S. Cl.
CPC ........... *G06T 2207/20021* (2013.01); *G06T 2207/20132* (2013.01); *G06T 2207/30201* (2013.01); *H04N 23/73* (2023.01); *H04N 23/76* (2023.01)

(58) Field of Classification Search
CPC .......... H04N 23/80; G06T 7/223; G06T 2207/20021; G06T 2207/20132; G06T 2207/30201

See application file for complete search history.

(56) References Cited

U.S. PATENT DOCUMENTS

2016/0019421 A1* 1/2016 Feng .................... G06V 40/197
  382/117
2020/0053265 A1* 2/2020 Huang .................. H04N 23/73

FOREIGN PATENT DOCUMENTS

| CN | 110610176 A | 12/2019 |
| CN | 110691199 A | 1/2020 |
| CN | 111860154 A | 10/2020 |
| CN | 112584089 A | 3/2021 |
| CN | 112911146 A | 6/2021 |
| CN | 113612932 A | 11/2021 |
| JP | 2007249526 A | 9/2007 |
| JP | 2009123081 A | 6/2009 |
| WO | 2020179174 A1 | 9/2020 |
| WO | 2021026848 A1 | 2/2021 |

* cited by examiner

Static state
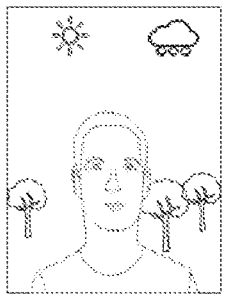
FIG. 3b-1
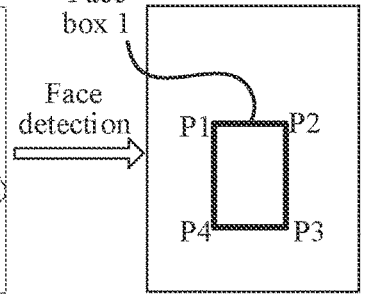
FIG. 3b-2 Face box 1
Face detection
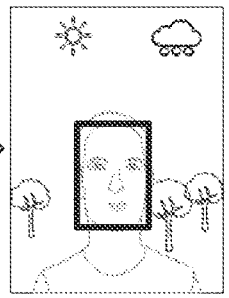
FIG. 3b-3
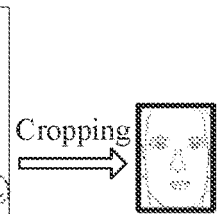
FIG. 3b-4
Cropping
Moving state
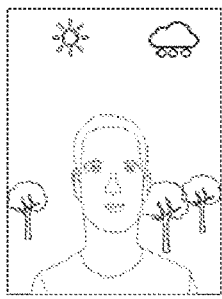
FIG. 3b-5
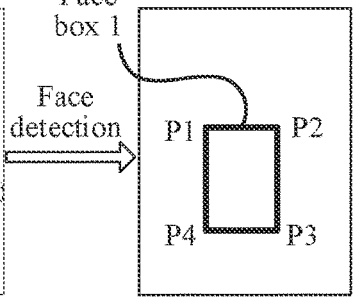
FIG. 3b-6 Face box 1
Face detection
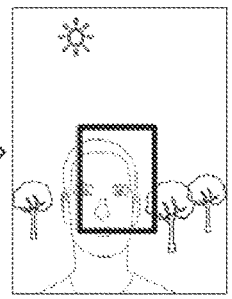
FIG. 3b-7
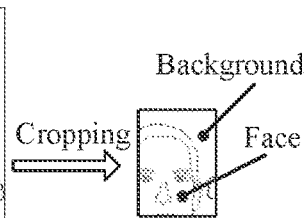
FIG. 3b-8
Cropping
FIG. 3B

EXPOSURE PARAMETER ADJUSTMENT METHOD, DEVICE AND STORAGE MEDIUM

CROSS-REFERENCE TO RELATED APPLICATIONS

This application is a national stage of International Application No. PCT/CN2022/091957, filed on May 10, 2022, which claims priority to Chinese Patent Application No. 202110909669.2, filed on Aug. 9, 2021. The disclosures of both of the aforementioned applications are hereby incorporated by reference in their entireties.

TECHNICAL FIELD

This application relates to the field of photography technologies, and in particular, to an exposure parameter adjustment method, a device, and a storage medium.

BACKGROUND

In order to shoot an image that meets a brightness requirement, an electronic device usually needs to adjust an exposure parameter of a camera when taking a picture. The exposure parameter may include an exposure time and a gain. For example, during shooting of a face image, the exposure parameter needs to be adjusted to obtain a face image with the brightness of a face region within a specific brightness range.

Currently, a method for adjusting an exposure parameter during shooting of a face image is to detect a face box of a previous-frame image by using a face detection algorithm, then crop a current-frame image by using the face box of the previous-frame image to obtain a face image of the current-frame image, perform adjustment based on the face image of the current-frame image to obtain an exposure parameter for a next frame, and shoot a next-frame image by using the exposure parameter for the next frame, and so on, until an image with the brightness of a face region within a specific brightness range is obtained.

When a position of a face in the next-frame image moves relative to a position of a face in the previous-frame image, a face image of the current-frame image obtained through cropping in such a manner usually has a relatively large difference from an actual face image of the current-frame image. Therefore, accuracy of an exposure parameter adjusted according to the foregoing method is relatively low.

SUMMARY

This application provides an exposure parameter adjustment method, a device, and a storage medium, to obtain a more accurate exposure parameter.

To achieve the foregoing objective, this application provides the following technical solutions:

A first aspect of this application provides an exposure parameter adjustment method, including:
  obtaining a face box of a first-frame image and a second-frame image, where the face box of the first-frame image is used to indicate a region of a face in the first-frame image, and the second-frame image is a next-frame image of the first-frame image;
  correcting the face box of the first-frame image to obtain a corrected face box;
  cropping the second-frame image based on the corrected face box to obtain a face image of the second-frame image; and
  adjusting an exposure parameter based on the face image of the second-frame image.

It can be seen from the foregoing content that, in this solution, a face box of a previous-frame image is first corrected, then a face image is cropped by using the corrected face box, so that a face image obtained through cropping and an actual face region in an image that is cropped are consistent. This helps obtain more accurate face brightness based on the face image, and adjust an exposure parameter based on the face brightness to obtain a more accurate exposure parameter.

In some optional embodiments, a proportion of a background part in the face image obtained through cropping by using the corrected face box is less than a proportion of a background part in a face image obtained through cropping directly by using the face box of the first-frame image.

In some optional embodiments, correcting the face box of the first-frame image may be: reducing a size of the face box of the first-frame image to obtain the corrected face box. It can be seen that a size of the corrected face box obtained in such as a manner is less than the size of the face box of the first-frame image.

It can be seen from the foregoing content that reducing the size of the face box can help reduce a proportion of pixels in the background part of the cropped face image, thereby reducing interference of the pixels in the background part to calculated face brightness. This ensures that face brightness of the current-frame image can be accurately obtained during subsequent exposure parameter adjustment, thereby obtaining a more accurate adjusted exposure parameter value.

In some optional embodiments, the size of the face box of the first-frame image may be reduced based on a preset proportional coefficient, so that a ratio of the size of the corrected face box to the size of the face box of the first-frame image is the proportional coefficient.

In some optional embodiments, during reduction of the size of the face box of the first-frame image, a position of a center point of the face box of the first-frame image may be kept unchanged, so that a position of a center point of the corrected face box is the same as the position of the center point of the face box of the first-frame image.

In some optional embodiments, the proportional coefficient may be determined by using a plurality of frames of images shot in advance.

In some optional embodiments, the plurality of frames of images used for determining the proportional coefficient may be several consecutive frames of images shot before the second-frame image. For example, if the second-frame image is the $(N+1)^{th}$ frame of image obtained by shooting, the plurality of frames of images used for determining the proportional coefficient may be the $(N-1)^{th}$ frame of image and the $N^{th}$ frame of image that are shot previously.

It can be seen from the foregoing content that, each time before a face box of a frame of image is corrected, a proportional coefficient can be determined by using several frames of images recently shot, to implement dynamic update of the proportional coefficient. An advantage of this lies in that, each time the face box is corrected, a proportional coefficient that matches a degree of change of a face region between two adjacent frames of images such as the foregoing first-frame image and second-frame image is obtained, so as to keep as many pixels located on a face as possible, which helps improve accuracy of calculated face brightness.

In some optional embodiments, before the proportional coefficient is determined by using several consecutive frames of images shot before the second-frame image, it is first determined whether a posture change amplitude of the first-frame image relative to each frame of image (other than the first-frame image) in the consecutive frames of images is less than or equal to a preset change amplitude threshold.

When the posture change amplitude of the first-frame image relative to each frame of image (other than the first-frame image) in the consecutive frames of images is less than or equal to the preset change amplitude threshold, the proportional coefficient is determined by using several consecutive frames of images shot before the second-frame image.

The posture change amplitude of the first-frame image relative to each frame of image in the several consecutive frames of images is obtained through calculation based on posture data of a camera device when the first-frame image is being shot and posture data of the camera device when the frame of image in the previous N frames of images is being shot.

It can be seen from the foregoing content that the dynamic update of the proportional coefficient is performed only when a posture of the camera device does not change much during shooting of previous several consecutive frames of images. An advantage of this lies in that using face boxes of two frames of images with an excessively large posture change amplitude of the electronic device to determine the proportional coefficient is avoided, thereby preventing generation of an excessively small proportional coefficient during the dynamic update.

In some optional embodiments, when the proportional coefficient is determined by using a plurality of frames of images shot in advance, face boxes of these images may be specifically used, where the face box of each frame of image is used to indicate a region of a face in a corresponding image.

In some optional embodiments, a method for determining a proportional coefficient by using the face boxes of the plurality of frames of images may be: overlapping the face boxes of the plurality of frames of images to obtain an overlapping region of the face boxes of the plurality of frames of images, and then determining the proportional coefficient based on the overlapping region and a face box of any frame of image in the plurality of frames of images.

In some optional embodiments, the determining the proportional coefficient based on the overlapping region and a face box of any frame of image in the plurality of frames of images may be specifically: determining a size of the overlapping region and a size of the face box of any frame of image in the plurality of frames of images, dividing the size of the overlapping region by the size of the face box of any frame of image in the plurality of frames of images, and determining an obtained ratio as the proportional coefficient.

In some optional embodiments, the face box of the first-frame image may be specifically corrected by using face boxes of previous two frames of images of the second-frame image, that is, the face box is corrected by using the face box of the first-frame image and a face box of a previous-frame image of the first-frame image.

In some optional embodiments, a posture change amplitude of the first-frame image relative to the previous-frame image is less than a preset change amplitude threshold, and the posture change amplitude of the first-frame image relative to the previous-frame image is obtained through calculation based on posture data of a camera device when the first-frame image is being shot and posture data of the camera device when the previous-frame image is being shot.

It can be seen from the foregoing content that the face box is corrected by using the face boxes of the previous two frames of images of the second-frame image is only when a posture change amplitude between the previous two frames of images is relatively small. An advantage of this lies in that using face boxes of two frames of images with an excessively large posture change amplitude of the electronic device to determine the corrected face box is avoided, thereby avoiding that the obtained corrected face box is too small.

In some optional embodiments, that the face box is corrected by using the face box of the first-frame image and a face box of a previous-frame image of the first-frame image may be specifically: overlapping the face box of the first-frame image and the face box of the previous-frame image of the first-frame image, and determining the overlapping region of the two as the corrected face box.

It can be seen from the foregoing content that reducing the size of the face box can help reduce a proportion of pixels in the background part of the cropped face image, thereby reducing interference of the pixels in the background part to calculated face brightness. This ensures that face brightness of the current-frame image can be accurately obtained during subsequent exposure parameter adjustment, thereby obtaining a more accurate adjusted exposure parameter value.

In some optional embodiments, correcting the face box of the first-frame image may be specifically: translating the face box of the first-frame image based on a pre-obtained motion vector, to obtain a translated face box as the corrected face box. An offset obtained in such a manner between a position of the corrected face box and a position of the face box of the first-frame image matches the foregoing motion vector.

It can be seen from the foregoing content that, translating the face box based on the motion vector can be applied to a face box of any shape, including a rectangle, and therefore correcting the face box by using this method has a wider scope of application. In addition, correcting the face box based on the motion vector can obtain a corrected face box that matches a position of the face in the second-frame image, and the proportion of the background part in the cropped face image can be reduced without reducing the face box. A face image with a larger area can be obtained, and further, pixels of the background part can be prevented from being included in the face image, so that face brightness calculated based on the face image is more accurate, and further, a more accurate exposure parameter can be obtained during exposure parameter adjustment based on the face brightness.

In some optional embodiments, before the face box of the first-frame image is translated, the motion vector can be determined by using the previous two frames of images of the second-frame image, namely, the first-frame image and the previous-frame image of the first-frame image.

In some optional embodiments, before the motion vector is determined by using the first-frame image and the previous-frame image of the first-frame image, it is determined whether a posture change amplitude of the first-frame image relative to the previous-frame image is less than a preset change amplitude threshold, and after it is determined that the posture change amplitude of the first-frame image relative to the previous-frame image is less than the preset change amplitude threshold, the motion vector is determined by using the first-frame image and the previous-frame image of the first-frame image.

The posture change amplitude of the first-frame image relative to the previous-frame image is obtained through calculation based on posture data of a camera device when the first-frame image is being shot and posture data of the camera device when the previous-frame image is being shot.

An advantage of adding the foregoing determining step lies in that a calculated motion vector with an excessively large offset can be avoided, thereby preventing an excessively large offset between the corrected face box and an actual face in the second-frame image that is cropped.

In some optional embodiments, a method for determining the motion vector by using the first-frame image and the previous-frame image of the first-frame image may be specifically: dividing the previous-frame image of the first-frame image into a plurality of image blocks, selecting a specific image block of the previous-frame image of the first-frame image as a query block, dividing the first-frame image into a plurality of image blocks, then selecting, as a target block, an image block that is in the plurality of image blocks of the first-frame image and that matches the query block, and finally determining the motion vector based on the query block and the target block.

In some optional embodiments, a method for determining the motion vector based on the query block and the target block may be: determining a center point of the query block as a start point of the motion vector, and determining a center point of the target block as an end point of the motion vector, to obtain a motion vector.

In some optional embodiments, during selection of the query block, an image block located in the center of the face box of the previous-frame image may be selected from the previous-frame image of the first-frame image as the query block. The query block is an image block that is in the plurality of image blocks obtained by dividing the previous-frame image and that is located in the center of a face box of the previous-frame image, and the face box of the previous-frame image is used to indicate a region of a face in the previous-frame image of the first-frame image.

In some optional embodiments, during selection of the target block, an image block that is in the plurality of image blocks of the first-frame image and whose offset value relative to the query block is less than a preset offset threshold may be selected as the target block, and the offset value of the image block relative to the query block represents a degree of a difference between the image block and the query block.

In some optional embodiments, the offset value between the two image blocks may be specifically a mean absolute difference or a mean squared error between the two image blocks.

In some optional embodiments, the adjusting an exposure parameter based on the face image of the second-frame image may specifically include:
  first determining face brightness of the second-frame image based on the face image of the second-frame image; and
  then adjusting an exposure parameter based on the face brightness of the second-frame image.

In some optional embodiments, the adjusting an exposure parameter based on the face brightness of the second-frame image may specifically include:
  if a difference between the face brightness of the second-frame image and preset standard brightness is beyond a preset range, adjusting the exposure parameter based on the difference between the face brightness of the second-frame image and the standard brightness.

In some optional embodiments, after the adjusting an exposure parameter based on the face image of the second-frame image, the method further includes:
  performing face detection on the second-frame image to obtain a face box of the second-frame image, where the face box of the second-frame image is used to indicate a region of a face in the second-frame image.

In some optional embodiments, during the period of shooting the first-frame image and the second-frame image, the face of the user being shot is moving, that is, a region of the face in the first-frame image is different from a region of the face in the second-frame image.

A second aspect of this application provides an electronic device. The electronic device includes one or more processors, a memory, and a camera.

The memory is configured to store one or more programs.

The one or more processors are configured to execute the one or more programs, so that the electronic device is enabled to perform the exposure parameter adjustment method provided in any embodiment of the first aspect of this application.

A third aspect of this application provides a computer storage medium, configured to store a computer program. When the computer program is executed, the exposure parameter adjustment method provided in any embodiment of the first aspect of this application is specifically implemented.

This application provides an exposure parameter adjustment method, a device, and a storage medium. The method includes: obtaining a face box of a first-frame image and a second-frame image, where the face box of the first-frame image is used to indicate a region of a face in the first-frame image, and the second-frame image is a next-frame image of the first-frame image; correcting the face box of the first-frame image to obtain a corrected face box; cropping the second-frame image based on the corrected face box to obtain a face image of the second-frame image; and adjusting an exposure parameter based on the face image of the second-frame image. In this solution, a face box of a previous-frame image is first corrected, then a face image is cropped by using the corrected face box, so that a face image obtained through cropping and an actual face region in an image that is cropped are consistent. This helps obtain more accurate face brightness based on the face image, and adjust an exposure parameter based on the face brightness to obtain a more accurate exposure parameter.

BRIEF DESCRIPTION OF DRAWINGS

FIG. 3B is a schematic diagram of a face box of an image frame disclosed in an embodiment of this application;

DESCRIPTION OF EMBODIMENTS

Figure 1A:
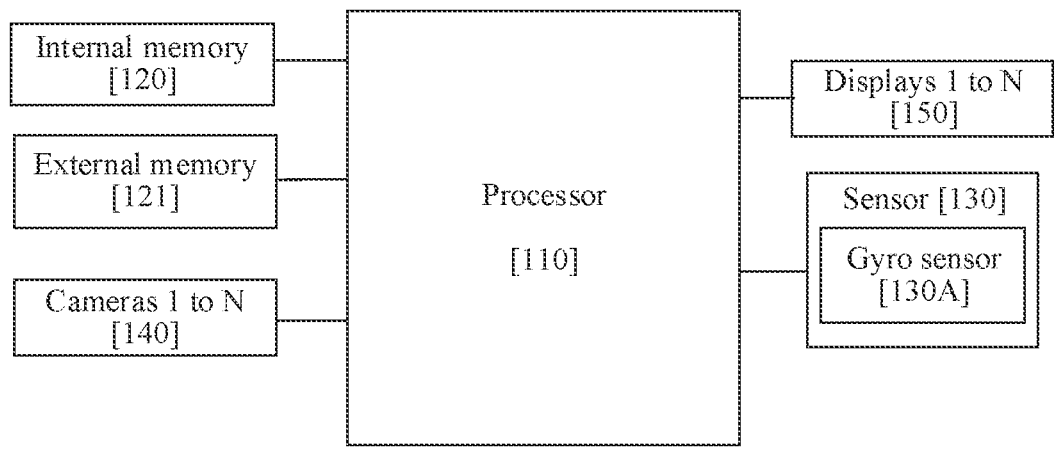
FIG. 1A is a schematic diagram of a structure of an electronic device disclosed in an embodiment of this application.

In the specification, claims, and accompanying drawings of this application, the terms "first", "second", "third", and so on are intended to distinguish between different objects but do not indicate a particular order In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "for example" or the like is intended to present a related concept in a specific manner An embodiment of this application provides an electronic device 100. Refer to FIG. 1A. The electronic device 100 may include: a processor 110, an internal memory (also referred to as a "memory") 120, an external memory 121, a sensor module 130, a camera 140, a display 150, and the like. The sensor module 130 may include a gyro sensor 130A and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The DSP is configured to process a digital signal, and may further process another digital signal in addition to a digital image signal. For example, when the electronic device 100 performs frequency selection, the DSP is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural-network (NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

A memory may be further disposed in the processor 110, and is configured to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, avoid repeated access, and reduce a waiting time of the processor 110, thereby improving system efficiency.

The internal memory 120, may be configured to store computer executable program code, and the executable program code includes instructions. The internal memory 120 may include a program storage region and a data storage region. The program storage region may store an operating system, an application program required by at least one function (for example, a voice playing function or an image playing function), and the like. The data storage region may store data (for example, audio data and an address book) and the like created when the electronic device 100 is used. In addition, the internal memory 120 may include a high-speed random access memory, or may include a non-volatile memory such as at least one magnetic disk memory, a flash memory, or a universal flash storage (UFS). The processor 110 runs the instructions stored in the internal memory 120 and/or the instructions stored in the memory disposed in the processor, to implement various functional applications and data processing of the electronic device 100.

The external memory 121 usually means an externally located memory. In this embodiment of this application, the external memory means a memory other than the memory of the electronic device and a cache of the processor, and the memory is generally a non-volatile memory. Common external memories include a hard disc, a soft disk, an optical disk, a USB flash disk, and a micro SD card, to expand a storage capability of the electronic device 100. The external memory may communicate with the processor 110 by using an external memory interface or a bus, to implement a data storage function, for example storing a file such as a music or a video in the external memory.

The sensor module 130 may specifically include a gyro sensor 130A. The gyroscope sensor 130A may be configured to determine a motion posture of the electronic device 100. In some embodiments, an angular velocity of the electronic device 100 around three axes (i.e., x, y, and z axes) may be determined by using the gyroscope sensor 130A. The gyroscope sensor 130A may be used for image stabilization during photographing. For example, when the shutter is pressed, the gyroscope sensor 130A detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyroscope sensor 130A may also be used in navigation and a motion sensing game scenario.

The electronic device 100 may implement a photographing function by using the ISP, the camera 140, the video codec, the GPU, the display screen 150, the AP, and the like.

The ISP is configured to process data fed back by the camera 140. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may alternatively optimize parameters such as exposure and a color temperature of a photographing scenario. In some embodiments, the ISP may be disposed in the camera 140.

The camera 140 is configured to capture a static image or a video. An optical image of an object is generated through a lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 140, and N is a positive integer greater than 1.

The electronic device 100 implements a display function by using the GPU, the display screen 150, the AP, and the like. The GPU is a microprocessor for image processing, and is connected to the display screen 150 and the AP. The GPU is configured to perform mathematical and geometric calculation, and is configured to render graphics. The processor 110 may include one or more GPUs, and execute program instructions to generate or change display information.

The display screen 150 is configured to display an image, a video, and the like. The display screen 150 includes a display panel. The display panel may be a liquid crystal display (LCD), an organic light-emitting diode (OLED), an active-matrix organic light-emitting diode (AMOLED), a flex light-emitting diode (FLED), a mini LED, a micro LED, a micro-OLED, a quantum dot light emitting diode (QLED), or the like. In some embodiments, the electronic device 100 may include one or N display screens 150. N is a positive integer greater than 1.

This embodiment of this application is specifically described above by using the electronic device 100 as an example. It should be understood that the schematic structure in this embodiment of this application constitutes no specific limitation on the electronic device 100. The electronic device 100 may have more or fewer components than those shown in the figure, or may combine two or more components, or may have a different component configuration. The components shown in the figure may be implemented in hardware, software, or a combination of hardware and software that includes one or more signal processing and/or application-specific integrated circuits.

In some possible embodiments, the foregoing memory 120 may be configured to store one or more programs; and the processor 110 is configured to execute the one or more programs stored in the memory, so that the electronic device is enabled to perform an exposure parameter adjustment method provided in any embodiment of this application.

In some possible embodiments, the external memory 121 may serve as a computer storage medium to store a computer program. When the stored computer program is executed, the exposure parameter adjustment method provided in any embodiment of this application is specifically implemented.

A user may view web pages, news, articles, and the like by using the electronic device shown in FIG. 1A, and may also play games and watch videos by using the electronic device. When the user view web pages, news, or articles, or play games or watch videos by using the electronic device, the user may stare at the display of the electronic device for a long time. In response to staring at the display of the electronic device for a long time by the user, the electronic device performs a corresponding event, for example, leaves the display not off or turns down ringtone volume, after detecting that the user stares at the display for a long time.

The foregoing electronic device may be a device such as a mobile phone or a tablet computer.

Figure 1B:
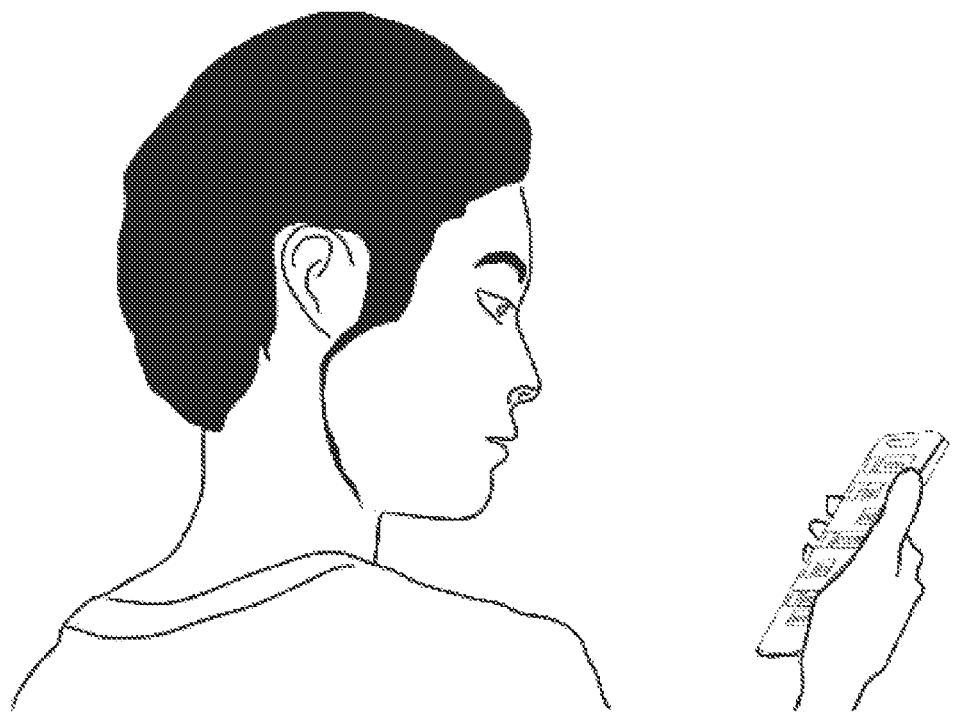
FIG. 1B is a schematic diagram of a scenario in which a user views a web page by using an electronic device disclosed in an embodiment of this application.

FIG. 1B shows a scenario in which a user views a web page by using an electronic device. This scenario is used as an example to describe a solution in which the electronic device detects that the user stares at the display for a long time, and performs a corresponding event.

Figure 2A:
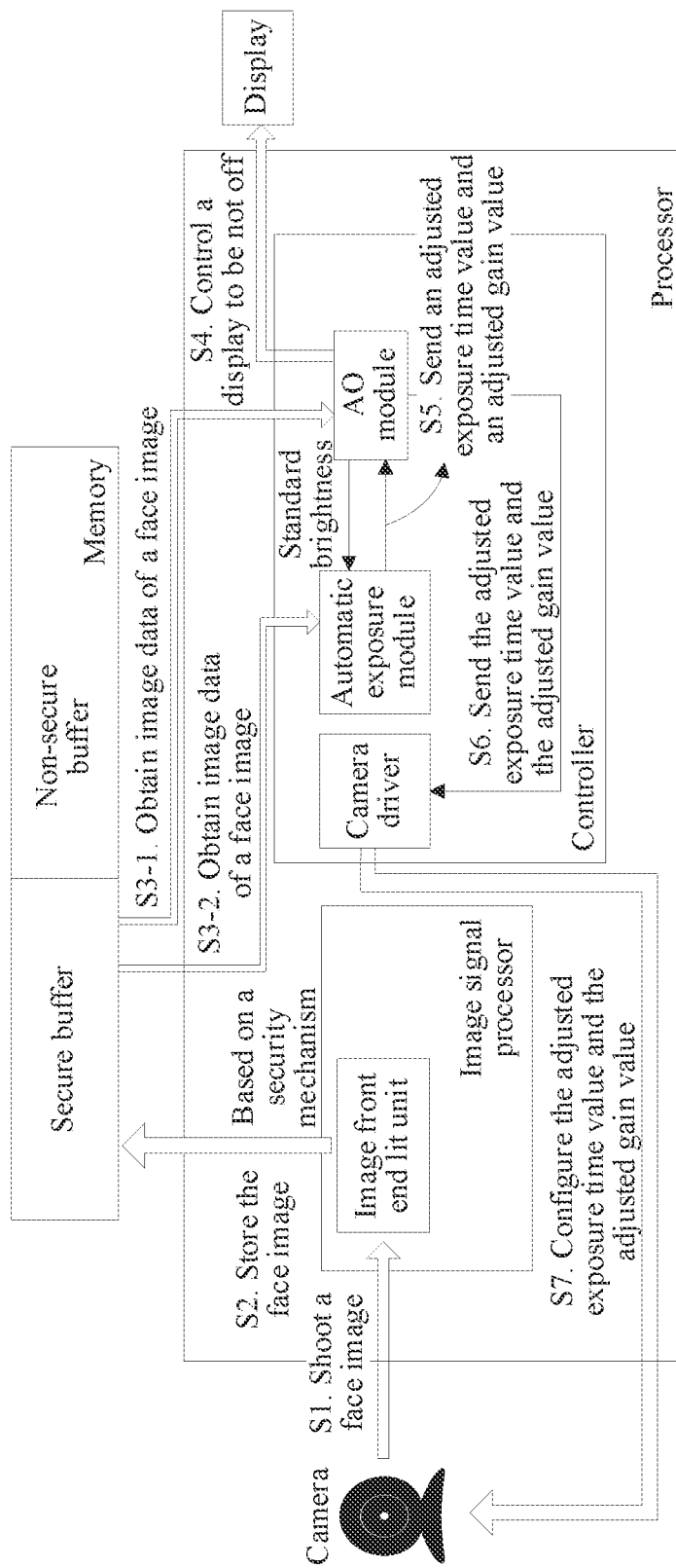
FIG. 2A is a schematic diagram of a software architecture of an electronic device disclosed in an embodiment of this application.

Refer to FIG. 2A, an image front end lit (IFE lit) unit is an integrated unit in an image signal processor. An image output by a camera reaches the IFE lit integrated unit, which stores the image output by the camera into a secure buffer of a memory.

An automatic exposure module belongs to a logic unit of a controller, and is obtained by the controller by running an automatic exposure (AE) algorithm.

An AO (always on) module also belongs to a logic unit of the controller, and is obtained by the controller by running an AO (always on) solution. The AO solution is a solution that implements intelligent perception based on an AO camera (always on camera), and usually includes functions such as human eye gaze recognition, machine owner recognition, and gesture recognition, and a typical characteristic is long-time low-power operating.

A camera driver also belongs to a logic unit of the controller, and is used to configure a parameter for the camera and open or close the camera.

A display of the electronic device displays a web page, and the user stares at the display of the electronic device to view the web page. As shown in FIG. 2A, a front-facing camera of the electronic device is running, and performs step S1 to shoot a face image of the user. The image front end lit unit performs step S2 to read the face image, and store the face image into the secure buffer of the memory based on a security mechanism. The AO module performs step S3-1 to obtain image data of the face image stored in the secure buffer of the memory, and determine, by analyzing the image data, whether the user's eye is staring at the display. When determining that the user's eye is staring at the display, the AO module performs step S4 to control the display of the electronic device to leave the display not off.

Image quality of the face image shot by the camera determines accuracy in determining, by the AO module, whether the user's eye is staring at the display. Especially when image brightness of the face image shot by the camera is relatively high or low, there is a relatively large error in determining, by the AO module, whether the user's eye is staring at the display. Therefore, in FIG. 2A, as shown in step S3-2, the automatic exposure module obtains the image data of the face image stored in the memory; and calculates the image brightness of the face image by using the image data, and compares the calculated image brightness with standard brightness to obtain a comparison result; adjusts, based on the comparison result, an exposure parameter of the camera, which is generally an exposure time and a gain, to obtain an adjusted exposure time value and an adjusted gain value. The automatic exposure module further performs step S4 to transmit the calculated adjusted exposure time value and the adjusted gain value to the AO module. Then, as shown in step S5 in FIG. 2A, the AO module send the adjusted exposure time value and the adjusted gain value to the camera driver. As shown in step S7 in FIG. 2A, the camera driver configures the camera to operate by using the adjusted exposure time value and the adjusted gain value.

The foregoing standard brightness may be preconfigured in the AO module. The standard brightness may be configured as brightness of the face image when the AO module determines, with a smallest error, whether the user's eye is staring at the display, or may be configured as brightness of a face region of the face image when the AO module determines, with a smallest error, whether the user's eye is staring at the display. For example, the standard brightness may be set to 522.

Figure 2B:
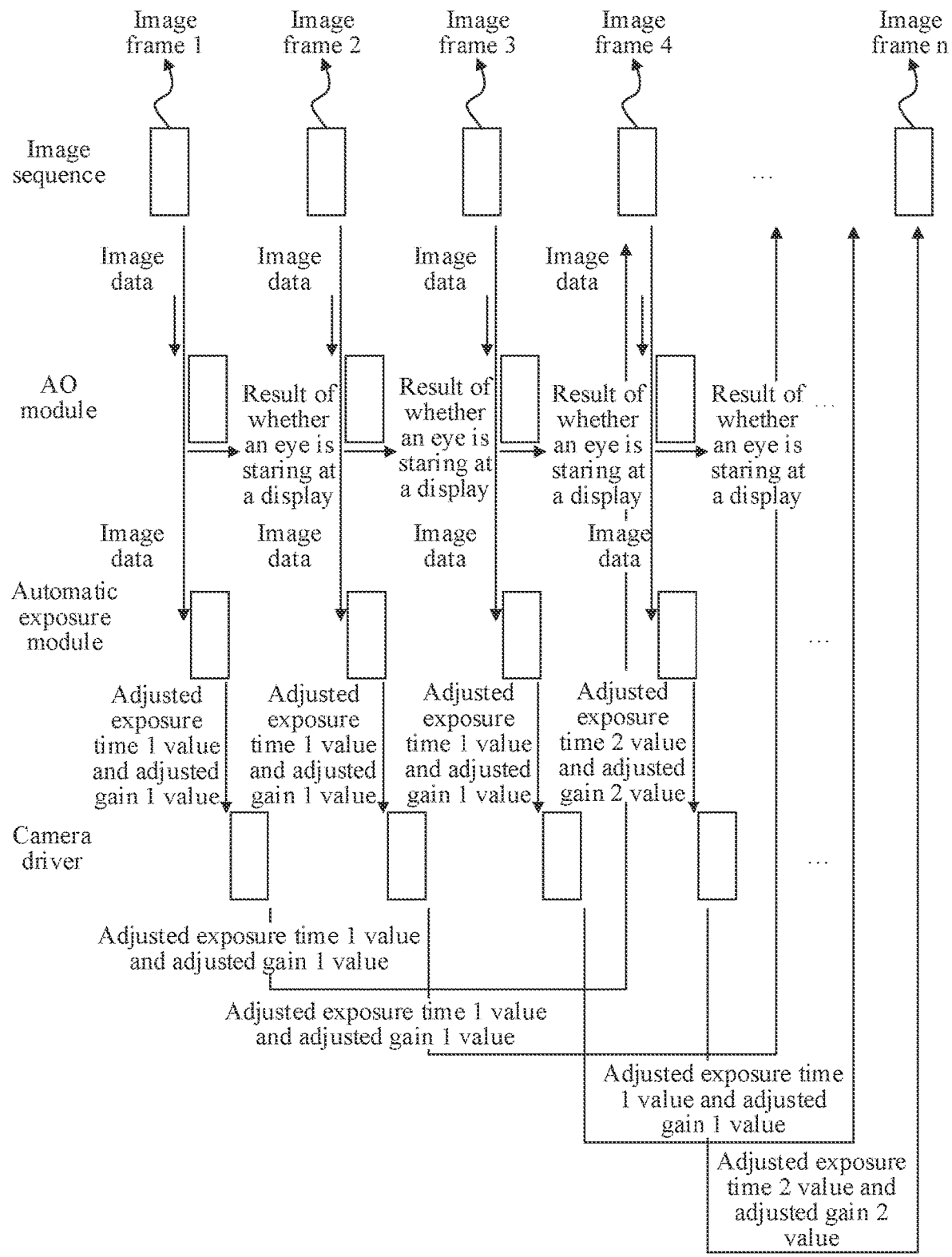
FIG. 2B is a schematic diagram of a running manner of an AO module and an automatic exposure module disclosed in an embodiment of this application.

The following describes, with reference to FIG. 2B, specific manners in which the AO module analyzes the image data and determines whether the user's eye is staring at the display and the automatic exposure module adjusts an exposure parameter of the camera.

Each time the automatic exposure module obtains image data of a frame of image, it uses the image data of this frame of image to perform an exposure parameter adjustment process, and the exposure parameter includes the foregoing exposure time and gain. The following describes the exposure parameter adjustment process by using a first frame of face image (also referred to as an image frame 1) as an example.

Refer to FIG. 2B. An image sequence includes a plurality of frames of images shot by the camera, such as image frames 1, 2, 3, 4, . . . , n, where the camera starts to operate by using a common exposure time and a common gain. Generally, the common exposure time and the common gain may be preset. The automatic exposure module sequentially obtains image data of all frames of images from the image sequence based on a storage order of the images. For the first-frame image (also referred to as the image frame 1), the automatic exposure module uses image data of the image frame 1 to calculate image brightness of the image frame 1, and compares the image brightness of the image frame 1 with the standard brightness to obtain a comparison result. If the comparison result shows that a difference between the image brightness of the image frame 1 and the standard brightness is less than a preset value (for example, ±10%), the automatic exposure module skips performing operations, and the camera still operates by using an original exposure time and an original gain. The original exposure time and the original gain are preset common exposure times and gains. If the comparison result shows that the difference between the image brightness of the image frame 1 and the standard brightness is not less than the preset value, the automatic exposure module adjusts the exposure time and the gain of the camera based on the comparison result, to obtain an adjusted exposure time 1 value and an adjusted gain 1 value. The automatic exposure module transmits the adjusted exposure time 1 value and the adjusted gain 1 value to the camera driver through the AO module. The camera driver configures the camera to shoot images by using the adjusted exposure time 1 value and the adjusted gain 1 value.

Due to impact of shooting an image by the camera after the automatic exposure module and the camera driver performs the procedure once, assuming that an image frame 2 and an image frame 3 are obtained through shooting by the camera by using the original exposure time and the original gain, the automatic exposure module calculates the adjusted exposure time 1 value and the adjusted gain 1 value in the foregoing processing manner by using image data of the image frame 2 and the image frame 3. The camera driver configures the camera to shoot images by using the adjusted exposure time 1 value and the adjusted gain 1 value. An image frame 4 is shot by using the adjusted exposure time 1 value and the adjusted gain 1 value that are configured for the camera. Also in the foregoing processing manner, the automatic exposure module calculates an exposure time 2 adjustment value and a gain 2 adjustment value by using image data of the image frame 4, and the camera driver configures the camera to shoot images by using the exposure time 2 adjustment value and the gain 2 adjustment value. This is repeated until the automatic exposure module obtains that a compared difference between the image brightness of the image frame and the standard brightness is less than the preset value, for example, ±10%.

The AO module also sequentially obtains image data of all frames of images from the image sequence based on the storage order of the images. For image data of each frame of image obtained by the AO module, the AO module performs the following procedure to obtain a determining result of whether an eye is staring at the display in each frame of image. The following is described by using an example in which the AO module processes the image data of the image frame 1.

The AO module compares the image data of the image frame 1 with a sample feature library, and configures a confidence level for the image frame 1 based on a result of comparison between the image data of the image frame 1 and the sample feature library. The confidence level is used to represent a probability that a human eye is staring at the display in the image frame 1. The AO module determines whether the confidence level for the image frame 1 is less than a threshold value, and if the confidence level for the image frame 1 is not less than the threshold value, determines that the eye is staring at the display in the image frame 1; or if the confidence level for the image frame 1 is less than the threshold value, determines that the eye is not staring at the display in the image frame 1.

In some embodiments, the sample feature library includes feature data indicating that an eye is staring at an image of the display. A manner of determining the feature data is: obtaining a large quantity of sample images, including sample images in which eyes are staring at the display and sample images in which eyes are not staring at the display, and performing learning by using image data of each sample image to obtain the feature data indicating that an eye is staring at an image of the display. Both the sample images in which eyes are staring at the display and the sample images in which eyes are not staring at the display are face images shot by the front-facing camera of the electronic device.

When determining that images within specific duration have a frame of image in which an eye is staring at the display, the AO module performs a corresponding event, such as controlling the electronic device to leave the display not off or to turn down ringtone volume.

A frame of face image may be divided into two parts: a face and a background. Image quality of the background has weak impact on accuracy of a gaze detection result. However, image quality of the face has relatively significant impact on accuracy of the gaze detection result.

Figure 3A:
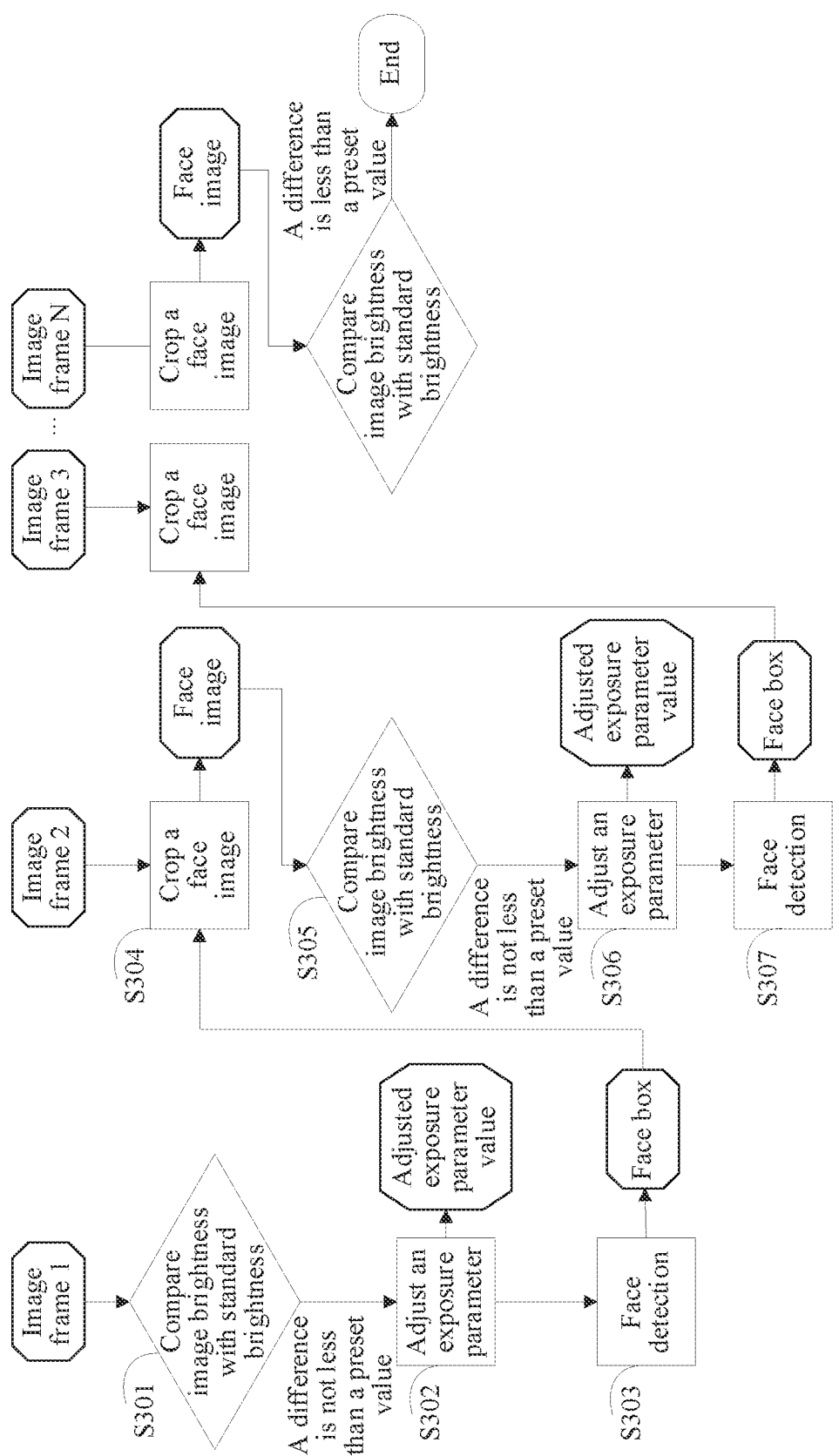
FIG. 3A is a schematic diagram of an implementation of adjusting an exposure parameter by an automatic exposure module disclosed in an embodiment of this application.

Therefore, to reduce an amount of calculation and obtain appropriate exposure parameter faster, the automatic exposure module may adjust an exposure parameter based on face brightness of an image frame, and stop adjusting the exposure parameter when a difference between the face brightness of the image frame and the standard brightness is less than the preset value Refer to FIG. 3A. A method for adjusting an exposure parameter based on image brightness of a face may include the following steps:

After obtaining an image frame 1, the automatic exposure module performs the following steps S301 to S303 for the image frame 1.

S301: Compare image brightness with standard brightness.

The image brightness is obtained through calculation based on the image data of the image frame 1. The image frame 1 may be a first-frame image shot by a camera.

Image brightness of a specific image frame may be equal to an average value of brightness values of all pixels in this image frame. A brightness value Bri of each pixel in the image frame may be calculated by substituting a red pixel value R, a green pixel value G, and a blue pixel value B of this pixel, namely, RGB pixel values of this pixel into the following formula:

$$Bri=0.3 \times R+0.6 \times G+0.1 \times B$$

If a difference between the image brightness and the standard brightness is less than the preset value, the method ends, or if the difference between the image brightness and the standard brightness is not less than the preset value, step S302 is performed.

In FIG. 3A, the difference between the image brightness of the image frame 1 and the standard brightness is not less than the preset value, and therefore step S302 is performed.

S302: Adjusting an exposure parameter.

In step S302, the automatic exposure module adjusts the exposure parameter based on the difference between the image brightness of the image frame 1 and the standard brightness, to obtain an adjusted exposure parameter value. For a specific execution process of step S302, refer to the foregoing exposure parameter adjustment process. Details are not described again. The adjusted exposure parameter value obtained after step S302 is performed is transmitted to a camera driver, so that the camera driver configures the camera to shoot images by using the adjusted exposure parameter value.

The adjusted exposure parameter value may include an adjusted exposure time value and an adjusted gain value. Each time after the automatic exposure module obtains an adjusted exposure parameter value by using a frame of image, the adjusted exposure parameter value may be sent to the camera driver, and the camera driver may configure the camera to shoot one or more image frames based on the adjusted exposure parameter value.

For example, after performing step S302, the automatic exposure module sends the obtained adjusted exposure parameter value to the camera driver, and in this case, the camera is ready to shoot an image frame 4. Then the camera driver configures the camera to shoot the image frame 4 based on the adjusted exposure parameter value obtained in step S302.

S303: Perform face detection.

After performing face detection on the image frame 1, a face box of the image frame 1 is obtained. The face box of the image frame 1 may be stored in a memory of the electronic device. For an image frame, if there is a face in this image frame, a face box of this image frame can be obtained through face detection, where the face box of this image frame is used to indicate a region of a face in this image frame.

In the electronic device, a face box of a frame of face image may be stored in the memory of the electronic device in a form of coordinate data of a plurality of vertices. Each piece of coordinate data corresponds to a specific pixel in the face image. Pixels corresponding to the coordinate data may be connected by using line segments to obtain a polygonal frame, and this polygonal frame is the face box of this frame of face image. Therefore, in any embodiment of this application, obtaining a face box of a frame of image is equivalent to reading coordinate data of vertexes of the face box.

FIG. 3B is used as an example. FIG. 3b-1 represents the image frame 1 shot by the camera. After a face detection module performs face detection on FIG. 3b-1, the following coordinate data is obtained: P1(X1, Y1), P2(X2, Y1), P3(X2, Y2), P4(X1, Y2). A face box 1 shown in FIG. 3b-2 can be obtained by determining pixels corresponding to the foregoing coordinate data in the image frame 1 and connecting corresponding pixels.

In some possible embodiments, step S303 may be implemented by the face detection module. The face detection module belongs to a logic unit of a controller, and is obtained by the controller by running a face detection algorithm. The face detection module may be a submodule configured in the automatic exposure module, or may be an independent module.

A face detection technology is a process of determining whether a frame of image or a video includes a face, and determining a position and a size of the face. A premise of implementing face detection is to construct a face detector. In this application, the face detector may be constructed in a plurality of manners. For example, the face detection module may construct a face detector in advance in the following manner, and use the face detector to implement face detection:

Face detection can be implemented by using Haar-like features and an AdaBoost algorithm. In this method, a face is represented by using Haar-like features, the Haar-like features are used for training to obtain a weak classifier, and multiple weak classifiers that can best represent the face are selected by using the AdaBoost algorithm to form a strong classifier, and several strong classifiers are connected in series to form a cascaded classifier with a cascaded structure, that is, a face detector.

After obtaining an image frame 2, the automatic exposure module performs steps S304, S305, S306, and S307 for the image frame 2.

S304: Crop a face image.

The automatic exposure module uses the face box of the image frame 1 to crop the image frame 2 to obtain the face image.

Refer to FIG. 3b-3 in FIG. 3B. After obtaining the face box of the image frame 1 and the image frame 2, the automatic exposure module may determine, in the image frame 2, the face box of the image frame 1.

Figure 4:
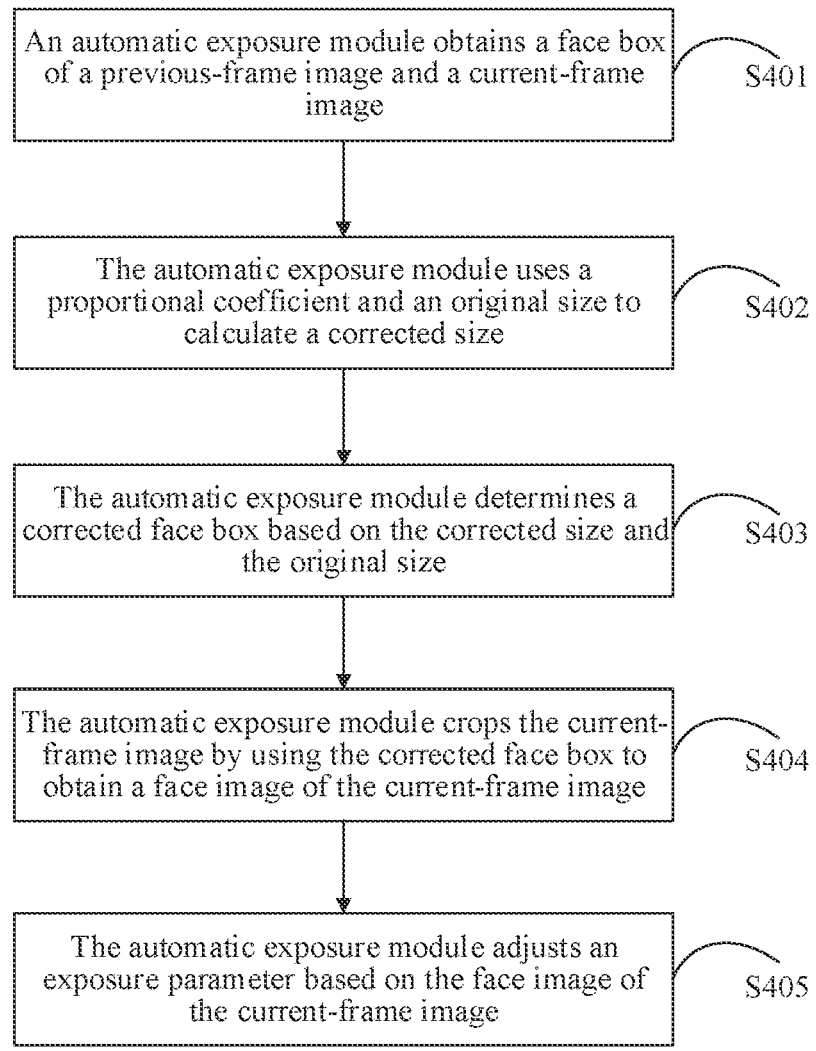
FIG. 4 is a flowchart of an exposure parameter adjustment method disclosed in an embodiment of this application.

Then, the automatic exposure module calculates, based on the face box of the image frame 1, whether each pixel of the image frame 2 is located in the face box 1 obtained through detection on the image frame 1, so that each pixel of the image frame 2 in the face box of the image frame 1 can be read. An image including the pixels in the image frame 2 that are located in the face box 1 is a face image obtained through cropping of the image frame 2 by using the face box 1. Refer to FIG. 3B. FIG. 3b-4 is a face image obtained through cropping of the image frame 2 by using the face box 1.

S305: Compare face brightness with the standard brightness.

When step S305 is performed for the image frame 2, the face brightness used for comparison is face brightness of the image frame 2. The face brightness of the image frame 2 may be calculated by using image data of the cropped face image of the image frame 2. For a specific calculation method, refer to the foregoing method for calculating the image brightness based on the image data of the image frame 1. Details are not described again.

For example, the image brightness of the image frame 2 may be equal to an average value of brightness of all pixels in the face image of the image frame 2.

After step S305 is performed, if a difference between the face brightness and the standard brightness is less than the preset value, the method ends, or if the difference between the face brightness and the standard brightness is not less than the preset value, step S306 is performed.

In this embodiment, a difference between face brightness of the image frame 2 and the standard brightness is not less than the preset value, and therefore step 306 is performed.

S306: Adjust the exposure parameter.

In step S306, the automatic exposure module adjusts the exposure parameter based on the difference between the face brightness of the image frame 2 and the standard brightness, to obtain an adjusted exposure parameter value. For a specific execution process of step S306, refer to the foregoing exposure parameter adjustment process.

Similar to step S302, the adjusted exposure parameter value obtained in S306 is sent to the camera driver, and the camera driver configures the camera to shoot one or more image frames based on the adjusted exposure parameter value obtained in step S306.

For example, when the adjusted exposure parameter value obtained in S306 is sent to the camera driver, the camera is ready to shoot an image frame 5. Then the camera driver configures the camera to shoot the image frame 5 based on the adjusted exposure parameter value obtained in step S306.

S307: Perform face detection.

A specific implementation of step S307 is the same as that of step S303, that is, the face detection module is used to perform face detection on a specific image frame to obtain a face box of the specific image frame. A difference between step S307 and step S303 lies in that the image frame for detection in step S303 is the image frame 1 and the image frame for detection in step S307 is the image frame 2.

As shown in FIG. 3A, starting from the image frame 2, each time the automatic exposure module obtains an image frame, it uses a face box of a previous image frame to crop this image frame to obtain a face image of this image frame, and then face brightness of this image frame is determined based on a face image of this image frame. After that, if a compared difference between the face brightness of this image frame and the standard brightness is less than the preset value, the method ends. If the compared difference between the face brightness of this image frame and the standard brightness is not less than the preset value, the exposure parameter is adjusted by using the face image of this image frame, face detection is performed on this image frame to obtain the face box of this image frame after the exposure parameter is adjusted, and so on, until a difference between face brightness of a specific image frame and the standard brightness is less than the preset value.

The foregoing manner of adjusting an exposure parameter based on image brightness of a face has the following problem:

Refer to FIG. 3B. In an example shown in FIG. 3b-1 to FIG. 3b-4, a user's face is in a static state during a shooting process, and a position of the face in the image frame 1 is basically the same as a position of the face in the image frame 2. Therefore, the face box of the image frame 1 can be more accurately obtained through cropping by using the face image of the image frame 2.

However, in some shooting scenarios, a user's face (or an electronic device used for shooting) may be in a moving state during a shooting process, resulting in inconsistent positions of the face in two shot adjacent frames of images. Still refer to FIG. 3B. FIG. 3b-5 to FIG. 3b-8 in FIG. 3B are an example of images shot in a moving state. FIG. 3b-5 represents the image frame 1. FIG. 3b-6 represents the face box of the image frame 1 obtained through face detection on the image frame 1. FIG. 3b-7 represents the image frame 2.

Refer to 3B-7. After the face box of the image frame 1 is determined in the image frame 2, it can be seen that there is an offset between a region in which the face is actually located in the image frame 2 and a region of the face box of the image frame 1.

Refer to FIG. 3b-8. FIG. 3b-8 is a face image obtained through cropping based on the face box of the image frame 1 and the image frame 2 shown in FIG. 3b-7. It can be seen that in the moving state, the face image obtained through cropping of the image frame 2 by using the face box of the image frame 1 cannot accurately match an actual face in the image frame 2, but contains a part of the face and a part of the background in the image frame 2. Therefore, the face brightness calculated based on the image data of the cropped face image is inaccurate, which eventually results in low accuracy of the exposure parameter obtained through adjustment based on the face brightness.

Further, in the scenario shown in FIG. 1A in which the electronic device detects that the user is staring at the display for a long time, to reduce power consumption of the electronic device, an AO module generally configures an extremely low frame rate for the camera driver. Therefore, a shooting time interval of two adjacent frames of images is relatively long, and an offset between positions of the face in the two shot adjacent frames of images is larger, which results in a more inaccurate adjusted exposure parameter value eventually calculated based on the difference between the face brightness and the standard brightness.

For example, a frame rate configured by the AO module may be 5 frames per second, and at this frame rate, the camera shoots only one frame of face image every 200 milliseconds (ms).

To resolve the problem existing in the foregoing method for adjusting an exposure parameter based on image brightness of a face, this application provides an exposure parameter adjustment method. The following describes, in detail with reference to embodiments, the exposure parameter adjustment method provided in this application.

Embodiment 1

Refer to FIG. 4. An exposure parameter adjustment method provided in this embodiment may include the following steps.

S401: An automatic exposure module obtains a face box of a previous-frame image and a current-frame image.

The automatic exposure module may specifically read the face box of the previous-frame image and the current-frame image from a memory.

The current-frame image is a frame of image currently used by the automatic exposure module to adjust an exposure parameter. For example, when the automatic exposure module needs to use the (N+1)th frame of image shot by the camera to adjust the exposure parameter, the (N+1)th frame of image is the current-frame image.

The previous-frame image is a frame of image shot by the camera before the current-frame image. For example, if the current-frame image is the (N+1)th frame of image, the previous-frame image is the $N^{th}$ frame of image.

Figure 5:
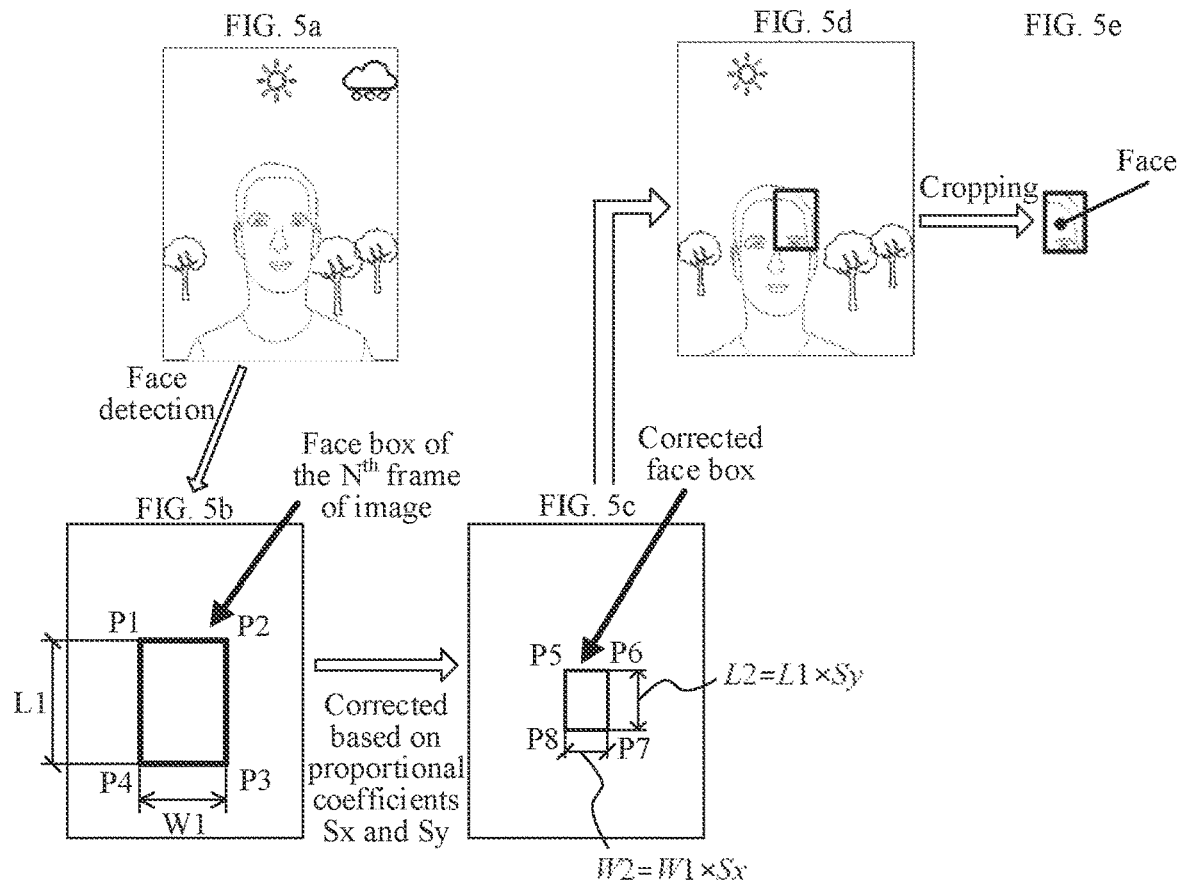
FIG. 5 is an example diagram of an exposure parameter adjustment method disclosed in an embodiment of this application.

Refer to FIG. 5. FIG. 5 is an example in which the automatic exposure module uses the $(N+1)^{th}$ frame of image to adjust the exposure parameter. FIG. 5a represents the $N^{th}$ frame of image. FIG. 5b represents a face box of the $N^{th}$ of frame of image obtained through face detection on the $N^{th}$ frame of image. FIG. 5d represents the $(N+1)^{th}$ frame of image.

The face box of the $N^{th}$ frame of image is obtained by performing face detection on the $N^{th}$ frame of image by a face detection module before step S401 is performed, that is, before the face box of the $N^{th}$ frame of image and the $(N+1)^{th}$ frame of image are obtained.

Through comparison between FIG. 5a and FIG. 5d, it can be seen that there is an offset between regions of the face in the $N^{th}$ frame of image and the $(N+1)^{th}$ frame of image.

S402: The automatic exposure module uses a proportional coefficient and an original size to calculate a corrected size.

The original size is a size of the face box of the previous-frame image in step S401, and specifically includes a length L1 and a width W1 of the face box of the previous-frame image.

The corrected size includes a corrected length and a corrected width.

When the face box of the previous-frame image includes only coordinate data of vertices and does not include length data and width data, the automatic exposure module may calculate the length L1 and the width W1 of the face box by using the coordinate data contained in the face box.

For example, the face box of the previous-frame image includes coordinate data of four vertices P1, P2, P3 and P4, and the coordinate data of the vertices is: P1(X1, Y1), P2(X2, Y1), P3(X2, Y2), and P4(X1, Y2). The automatic exposure module calculates a difference between horizontal coordinates of two pieces of coordinate data with a same vertical coordinate to obtain a width W1. In this example, W1 is equal to an absolute value of a difference between X1 and X2. The automatic exposure module calculates a difference between vertical coordinates of two pieces of coordinate data with a same horizontal coordinate to obtain a length L1. In this example, L1 is equal to an absolute value of a difference between Y1 and Y2

For example, an origin of horizontal and vertical coordinates in a frame of image may be a pixel at a vertex position in a lower-left corner of the image, and values of a horizontal coordinate and a vertical coordinate indicate which column and which row in the image a corresponding pixel is located at. For example, P1(X1, Y1) indicates that P1 is a pixel at the $X1^{th}$ column and the $Y1^{th}$ row in the image.

Refer to FIG. 5b. After obtaining the face box of the $N^{th}$ frame of image, the automatic exposure module may calculate the length L1 and the width W1 of the face box of the $N^{th}$ frame of image according to the foregoing method.

After obtaining the length L1 and the width W1 corresponding to the face box of the previous-frame image, the automatic exposure module multiplies the length L1 by a first proportional coefficient Sy to obtain a corrected length L2, which means that L2 is equal to L1 times Sy, and then the automatic exposure module multiplies the width W1 by a second proportional coefficient Sx to obtain a corrected width W2, which means that W2 is equal to W1 times Sx. The first proportional coefficient and the second proportional coefficient are collectively referred to as a proportional coefficient. The proportional coefficient may be dynamically determined by the automatic exposure module in a process of performing a method for correcting a face box in this embodiment, or may be preconfigured in the automatic exposure module, or may be preconfigured in an AO module and provided by the AO module to the automatic exposure module.

S403: The automatic exposure module determines a corrected face box based on the corrected size and the original size.

After obtaining the corrected width W2 and the corrected length L2, the automatic exposure module subtracts W2 from W1 to obtain a width change ΔW, and subtracts L2 from L1 to obtain a length change ΔL. Then, the automatic exposure module calculates the corrected face box based on the width change ΔW, the length change ΔL, and coordinate data of the four vertices in the face box of the previous-frame image. A face box corresponding to the corrected face box is referred to as the corrected face box.

In some possible implementations, the automatic exposure module determines the corrected face box based on the width change ΔW, the length change ΔL, and the coordinate data of the four vertices in the face box of the previous-frame image in the following manner.

For the face box with P1(X1, Y1), P2(X2, Y1), P3(X2, Y2), and P4(X1, Y2) of the previous-frame image, it is assumed that X1 is greater than X2 and Y1 is greater than Y2. After obtaining the width change ΔW and the length change ΔL, the automatic exposure module calculates corrected coordinates according to the following formulas:

$$X10=X1-\Delta W \div 2$$

$$X20=X2+\Delta W \div 2$$

$$Y10=Y1-\Delta L \div 2$$

$$Y20=Y2+\Delta L \div 2$$

X10, X20, Y10, and Y20 represent the corrected coordinates. Finally, coordinates corresponding to the face box of the previous-frame image is replaced with the corrected coordinates. To be specific, X1 is replaced with X10, X2 is replaced with X20, Y1 is replaced with Y10, and Y2 is replaced with Y20, to obtain the following corrected face box, where P5 to P8 represent vertices corresponding to the corrected face box:

P5(X10, Y10), P6(X20, Y10), P7(X20, Y20), and P8(X10, Y20).

The foregoing manner of correcting the face box based on the width change and the length change is equivalent to keeping a center point of the uncorrected face box unchanged and then reducing a width and a length of the face box based on the width change and the length change, to obtain the corrected face box.

Steps S402 and S403 are equivalent to a process of correcting the face box of the previous-frame image based on the proportional coefficients Sx and Sy.

Refer to FIG. 5b and FIG. 5c. After determining the width change ΔW and the length change ΔL based on the corrected size and the original size, the automatic exposure module keeps coordinates of a center point of the face box of the $N^{th}$ frame of image unchanged and moves the vertices P1 to P4 in the face box of the $N^{th}$ frame of image shown in FIG. 5b based on the width change ΔW and the length change ΔL, to obtain the moved vertices P5 to P8 shown in FIG. 5c. A polygonal frame determined by the moved vertices in FIG. 5c is the corrected face box obtained in step S403.

In other possible implementations of this application, the automatic exposure module may alternatively keep any point in the uncorrected face box unchanged, for example, keep a vertex in an upper-left corner of the face box of the uncorrected face box unchanged, and then reduce the width and the length of the face box based on the width change and the length change, to obtain the corrected face box.

Through comparison between FIG. 5b and FIG. 5c, it can be seen that, compared with the face box of the $N^{th}$ frame of image, the length L2, the width W2, the center point, a corrected face box that is consistent with the face box of the $N^{th}$ frame of image can be obtained through steps S401 and S403.

S404: The automatic exposure module crops the current-frame image by using the corrected face box to obtain a face image of the current-frame image.

After obtaining the corrected face box, the automatic exposure module determines the corrected face box in the current-frame image, and then extracts pixels in the current-frame image that are located in the corrected face box. An image including these pixels is the face image of the current-frame image obtained through cropping.

Refer to FIG. 5d and FIG. 5e. After the corrected face box is determined in the $(N+1)^{th}$ frame of image, pixels located in the corrected face box can be extracted from the $(N+1)^{th}$ frame of image. An image including these pixels located in the face box is a face image, shown in FIG. 5e, of the $(N+1)^{th}$ frame of image obtained through cropping.

It can be seen from FIG. 5e that the face image obtained through cropping by using the corrected face box includes only a part of the face in the $(N+1)^{th}$ frame of image shown in FIG. 5a, and hardly includes a background of FIG. 5a.

S405: The automatic exposure module adjusts an exposure parameter based on the face image of the current-frame image.

For a specific execution process of step S405, refer to step S305 and step S302 in the embodiment shown in FIG. 3A. Details are not described again.

The method for correcting a face box provided in this embodiment has the following beneficial effects:

When the current-frame image is cropped based on the face box of the previous-frame image, reducing the size of the face box can help reduce a proportion of pixels in the background part of the cropped face image, thereby reducing interference of the pixels in the background part to calculated face brightness. This ensures that face brightness of the current-frame image can be accurately obtained during subsequent exposure parameter adjustment.

The proportional coefficient used in Embodiment 1 may be determined according to the following method.

Figure 6:
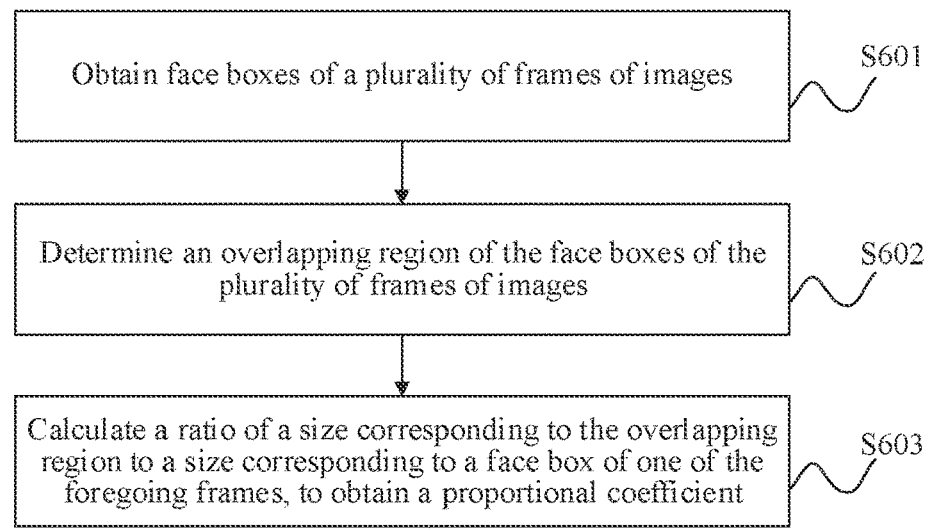
FIG. 6 is a flowchart of a method for determining a proportional coefficient disclosed in an embodiment of this application.

Refer to FIG. 6. A method for determining a proportional coefficient provided in an embodiment of this application may include the following steps.

The method for determining a proportional coefficient provided in this embodiment may be performed by the automatic exposure module or the AO module in the electronic device with an intelligent perception function shown in FIG. 2A, or may be performed by another electronic device different from the electronic device shown in FIG. 2A. The another electronic device may transmit the proportionality coefficient to the electronic device shown in FIG. 2A after determining the proportional coefficient, so that the automatic exposure module in the electronic device shown in FIG. 2A can perform, based on the proportional coefficient, the correction method provided in the foregoing embodiment.

S601: Obtain face boxes of a plurality of frames of images.

In some possible embodiments, the method for determining a proportional coefficient may be performed by using two frames of images.

Figure 7:
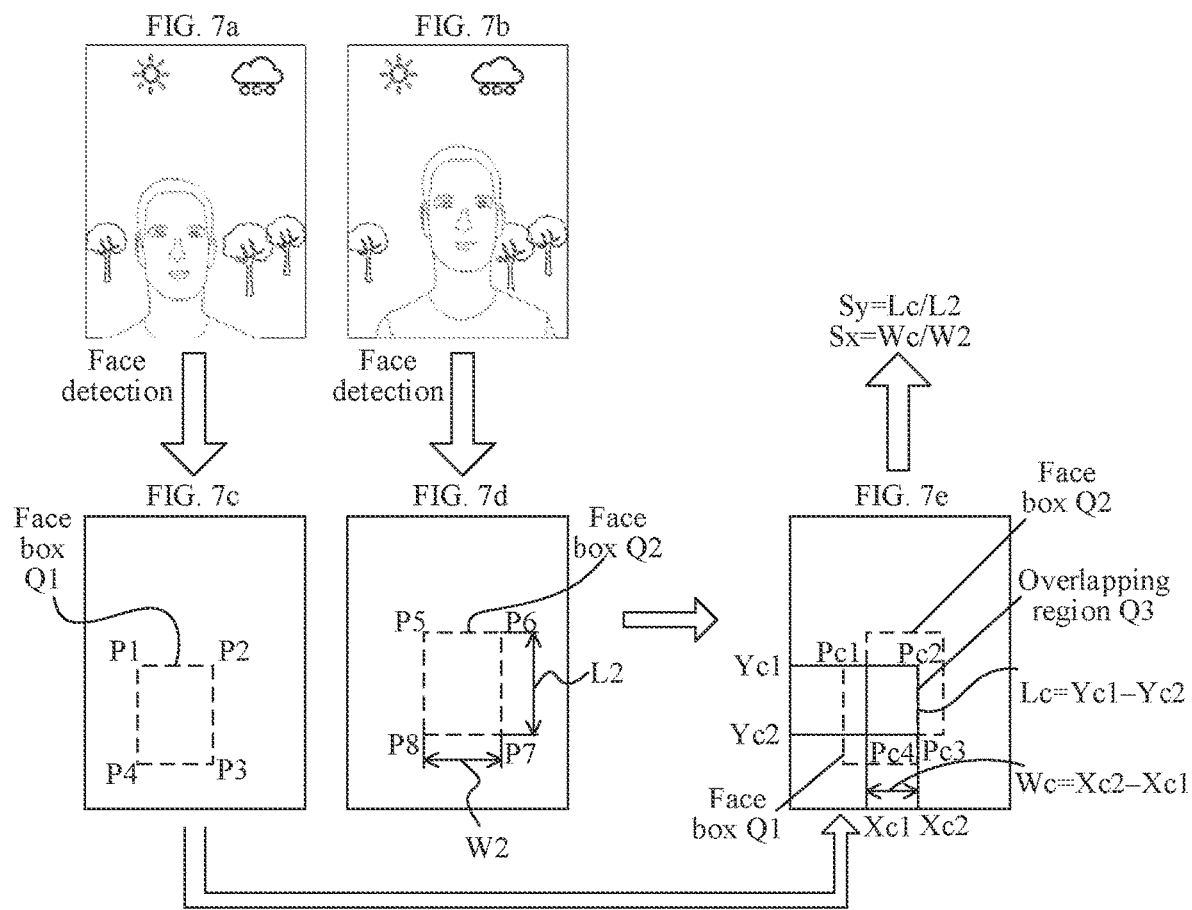
FIG. 7 is an example diagram of a method for determining a proportional coefficient disclosed in an embodiment of this application.

Refer to FIG. 7. FIG. 7 is an example diagram of determining a proportional coefficient by using two frames of images.

In FIG. 7, FIG. 7a and FIG. 7b represent two shot frames of images, and FIG. 7c and FIG. 7d are face boxes of two frames of images obtained in step S601. FIG. 7c is a face box Q1 obtained after performing face detection on FIG. 7a. FIG. 7d is a face box Q2 obtained after performing face detection on FIG. 7d. The face box Q1 includes the following coordinate data:

P1(X1, Y1), P2(X2, Y1), P3(X2, Y2), and P4(X1, Y2).

The face box Q2 includes the following coordinate data:

P5(X3, Y3), P6(X4, Y3), P7(X4, Y4), and P8(X3, Y4).

S602: Determine an overlapping region of the face boxes of the plurality of frames of images.

The overlapping region is a region in which the face boxes of the plurality of frames of images intersect. Similar to the face box, the overlapping region may also be represented by coordinate data of vertices.

For any two rectangular face boxes, an overlapping region of the two face boxes may be determined in the following manner:

determining an upper-left vertex and a lower-right vertex of each of the two face boxes, to obtain two upper-left vertices and two lower-right vertices; then selecting a maximum value of horizontal coordinates of the two upper-left vertices as a first horizontal coordinate, selecting a minimum value of vertical coordinates of the two upper-left vertices as a first vertical coordinate, selecting a minimum value of horizontal coordinates of the two lower-right vertices as a second horizontal coordinate, and selecting a maximum value of vertical coordinates of the two lower-right vertices as a second vertical coordinate; and using the first horizontal coordinate, the first vertical coordinate, the second horizontal coordinate, and the second vertical coordinate to determine four pieces of coordinate data, where vertices corresponding to these pieces of four coordinate data are vertices of the overlapping region of the two face boxes.

A method for determining the upper-left vertex of the face box is:

selecting a smaller horizontal coordinate from two horizontal coordinates included in coordinate data of the face box, and selecting a larger vertical coordinate from two vertical coordinates included in the coordinate data of the face box, where a vertex determined by the smaller horizontal coordinate and the larger vertical coordinate is the upper-left vertex of the face box.

A method for determining the lower-right vertex of the face box is:

selecting a larger horizontal coordinate from two horizontal coordinates included in coordinate data of the face box, and selecting a smaller vertical coordinate from two vertical coordinates included in the coordinate data of the face box, where a vertex determined by the larger horizontal coordinate and the smaller vertical coordinate is the lower-right vertex of the face box.

Refer to FIG. 7e. After the face box Q1 shown in FIG. 7c and the face box Q2 shown in FIG. 7d are obtained, it is determined that P1 is an upper-left vertex of the face box Q1 and P3 is a lower-right vertex of the face box Q1, and it is determined that P5 is an upper-left vertex of the face box Q2 and P7 is a lower-right vertex of the face box Q2.

Then, horizontal coordinates X1 and X3 of P1 and P5 are compared, and a maximum value max(X1, X3) is selected and denoted as Xc1. Vertical coordinates Y1 and Y3 of P1 and P5 are compared, and a minimum value min(Y1, Y3) is selected and denoted as Yc1. Horizontal coordinates X2 and X4 of P3 and P7 are compared, and a minimum value min(X2, X4) is selected and denoted as Xc2. Vertical coordinates Y2 and Y4 of P3 and P7 are compared, and a maximum value max(Y2, Y4) is selected and denoted as Yc2.

It can be seen from FIG. 7e that a rectangle enclosed by lines corresponding to Xc1, Xc2, Yc1, and Yc2 is an overlapping region Q3 of the face box Q1 and the face box Q2. In the electronic device, the overlapping region may be represented by using the following coordinate data:

Pc1(Xc1, Yc1), Pc2(Xc2, Yc1), Pc3(Xc2, Yc2), and Pc4 (Xc1, Yc2).

S603: Calculate a ratio of a size corresponding to the overlapping region to a size corresponding to a face box of one of the foregoing frames, to obtain a proportional coefficient.

An overlapping region obtained by stacking a plurality of rectangular face boxes is also a rectangular region. In step S603, a ratio obtained by dividing a length of the overlapping region by a length of any stacked face box is the first proportional coefficient Sy, and a ratio obtained by dividing a width of the overlapping region by a width of any stacked face box is the second proportional coefficient Sx.

Refer to FIG. 7. After the overlapping region Q3 of the face box Q1 and the face box Q2 is determined, the foregoing data representing the overlapping region may be used to calculate the length Lc=Yc1−Yc2 and the width Wc=Xc2−Xc1 of the overlapping region Q3. Finally, the first proportional coefficient Sy is obtained by dividing the length Lc of the overlapping region Q3 by the length L2 of the face box Q2, and the second proportional coefficient Sx may be obtained by dividing the width Wc of the overlapping region by the width W2 of the face box Q2.

It can be understood that the method for determining an overlapping region of two face boxes shown in FIG. 6 may be used to determine an overlapping region of any two rectangular boxes including the face boxes. For a specific process, refer to the embodiment shown in FIG. 6. Details are not described again.

Although in the example in FIG. 7, face boxes of two frames of images are used as an example, face boxes of three or more frames of images may alternatively be used to determine a proportional coefficient in the method for determining a proportional coefficient provided in this embodiment.

A total of three frames of images, namely an image 1, an image 2, and an image 3, are used as an example. According to the foregoing method, a first overlapping region may be determined by using a face box of the image 1 and a face box of the image 2, and because the first overlapping region also corresponds to a rectangular box, a second overlapping region may be determined by using the first overlapping region and a face box of the image 3 still according to the method shown in FIG. 6. The accordingly obtained second overlapping region is an overlapping region of the face box of the image 1, the face box of the image 2, and the face box of the image 3. By analogy, images of more than three frames may also be calculated according to the foregoing example method. Details are not described again.

In some possible implementations, the automatic exposure module of the electronic device shown in FIG. 2A, or the AO module of the electronic device shown in FIG. 2B, or another electronic device different from the electronic device shown in FIG. 2A may obtain face boxes of a plurality of frames of images in advance, then calculate a proportional coefficient according to the method shown in FIG. 6 and prestore the proportional coefficient into the automatic exposure module. After that, each time the automatic exposure module corrects a face box according to the foregoing embodiment, it uses the prestored proportional coefficient for correction.

In some other possible implementations, alternatively, each time before correcting a face box, the automatic exposure module may use face boxes of S previously shot frames of images to calculate a proportional coefficient used for current correction, to implement dynamic update of the proportional coefficient. S is a preset integer greater than or equal to 2.

To implement dynamic update of the proportional coefficient, the automatic exposure module sets a data buffer area used for buffering the face boxes of the S frames of images in a memory. Starting from a first-frame image shot by a camera, each time the automatic exposure module uses a face detection module to identify a face box of a frame of image, the face box of this frame of image is stored in the data buffer area. If the automatic exposure module finds that the data buffer area is full, an earliest stored face box is deleted and then the face box of the current frame is stored. In this way, when the automatic exposure module adjusts an exposure parameter for the $N^{th}$ frame of image (N is greater than S), face boxes of the $(N-S)^{th}$ frame to the $(N-1)^{th}$ frame are stored in the data buffer area.

Based on the foregoing data buffer area, before adjusting the exposure parameter for the $N^{th}$ frame of image (N is greater than S), the automatic exposure module reads face boxes of the S frames from the data buffer area, performs the method for determining a proportional coefficient shown in FIG. 6 based on the face boxes of the S frames, to obtain a proportional coefficient applicable to the $N^{th}$ frame of image, and then corrects the face box of the $(N-1)^{th}$ frame by using the proportional coefficient applicable to the $N^{th}$ frame of image, to obtain a corrected face box.

Optionally, in a solution of dynamic update of the proportional coefficient, if the data buffer area has not stored the face boxes of the S frames, the automatic exposure module may use a prestored proportional coefficient to correct the face box when adjusting the exposure parameter.

In the correction method provided in the foregoing embodiment, advantages of dynamic update of the proportional coefficient are as follows:

In the plurality of frames of images consecutively shot by the camera, a face position change between every two adjacent frames of images is not fixed. According to the foregoing method of dynamic update, each time a face box is corrected, a proportional coefficient that matches a degree of change of a face position between two adjacent frames of images may be obtained, so as to keep as many pixels located on a face as possible on the premise of reducing a proportion of a background part in cropped image data, which helps improve accuracy of calculated face brightness.

Further, in the solution of dynamic update of the proportional coefficient, the automatic exposure module may clear data in the data buffer area based on a posture change amplitude of a mobile phone. Each time before storing a face box of a frame of image into the data buffer area, the automatic exposure module may obtain posture data of the electronic device when this frame of image is being shot, and then use the posture data when this frame of image is being shot and posture data when the electronic device is shooting a target image, to calculate a posture change amplitude of this frame of image relative to the target image. If the posture change amplitude is not greater than a preset change amplitude threshold, the face box of this frame of image is directly stored. If the posture change amplitude is greater than the preset change amplitude threshold, all face boxes stored in the current data buffer area are deleted and then the face box of this frame of image is stored.

The posture data of the electronic device when this frame of image is being shot may be collected by the foregoing gyro sensor 130A and written into the memory. The posture data of the electronic device may include a tilt angle of the electronic device, and correspondingly, the posture change amplitude may be an angle difference between tilt angles included in two pieces of posture data.

In some optional embodiments, the target image includes a frame of image corresponding to each face box currently stored in the data buffer area.

In some other optional embodiments, the target image may alternatively include only a frame of image corresponding to any one of the face boxes currently stored in the data buffer area. For example, the target image may be a frame of image corresponding to a face box earliest stored in the data buffer area.

For example, it is assumed that face boxes of an image frame 1 to an image frame 3 are stored in the data buffer area. When the automatic exposure module needs to store a face box of an image frame 4, the automatic exposure module separately determines a posture change amplitude of the image frame 4 relative to the image frame 1, a posture change amplitude of the image frame 4 relative to the image frame 2, and a posture change amplitude of the image frame 4 relative to the image frame 3. If each posture change amplitude is not greater than the change amplitude threshold, the automatic exposure module stores the face box of this frame of image into the data buffer area. If any one of the posture change amplitudes is greater than the change amplitude threshold, the automatic exposure module deletes the face boxes of the image frame 1 to the image frame 3 stored in the current data buffer area and then stores the face box of the image frame 4.

If a posture change amplitude of the electronic device between two frames of images is too large, obviously an overlapping region of face boxes in the two frames of images is relatively small, which results in an excessively small proportional coefficient determined by using the face boxes of the two frames of images. Clearing the data in the data buffer area based on the posture change amplitude of the electronic device can avoid using face boxes of two frames of images with an excessively large posture change amplitude of the electronic device to determine the proportional coefficient, thereby preventing generation of an excessively small proportional coefficient during the dynamic update.

Embodiment 2

Figure 8:
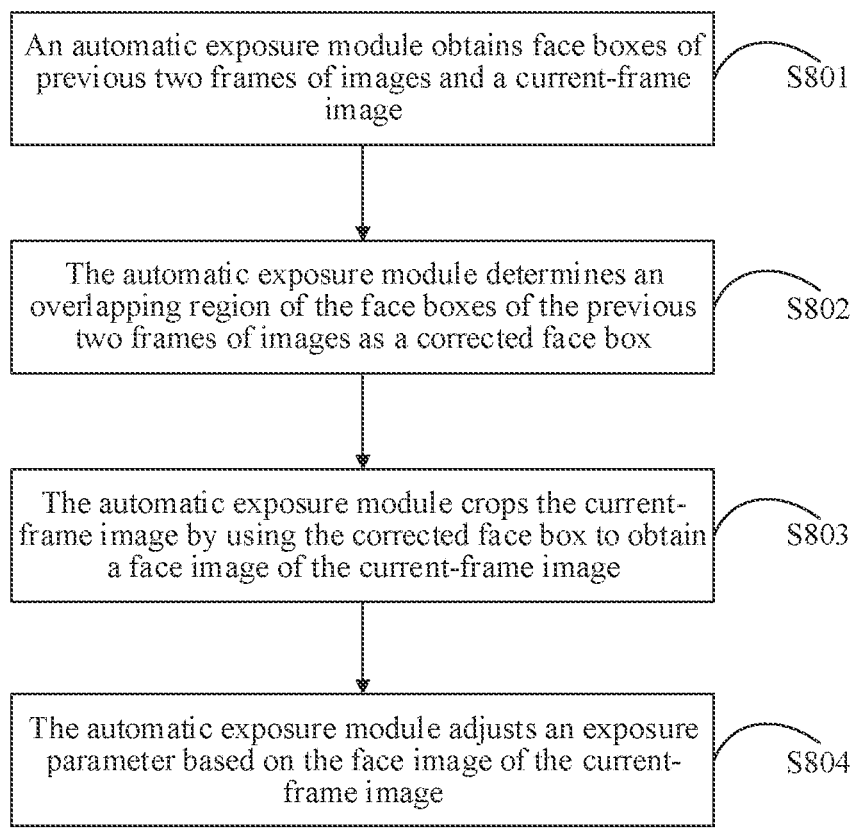
FIG. 8 is a flowchart of another exposure parameter adjustment method disclosed in an embodiment of this application.

Embodiment 2 of this application further provides an exposure parameter adjustment method. Refer to FIG. 8. The exposure parameter adjustment method provided in this embodiment includes the following steps.

S801: An automatic exposure module obtains face boxes of previous two frames of images and a current-frame image.

The previous two frames of images are two frames of images shot before the current-frame image. The current-frame image is shot by a camera and stored in a memory. The face boxes of the previous two frames of images are detected by a face detection module and stored in the memory. In step S801, the automatic exposure module can read the foregoing data from the memory.

Figure 9:
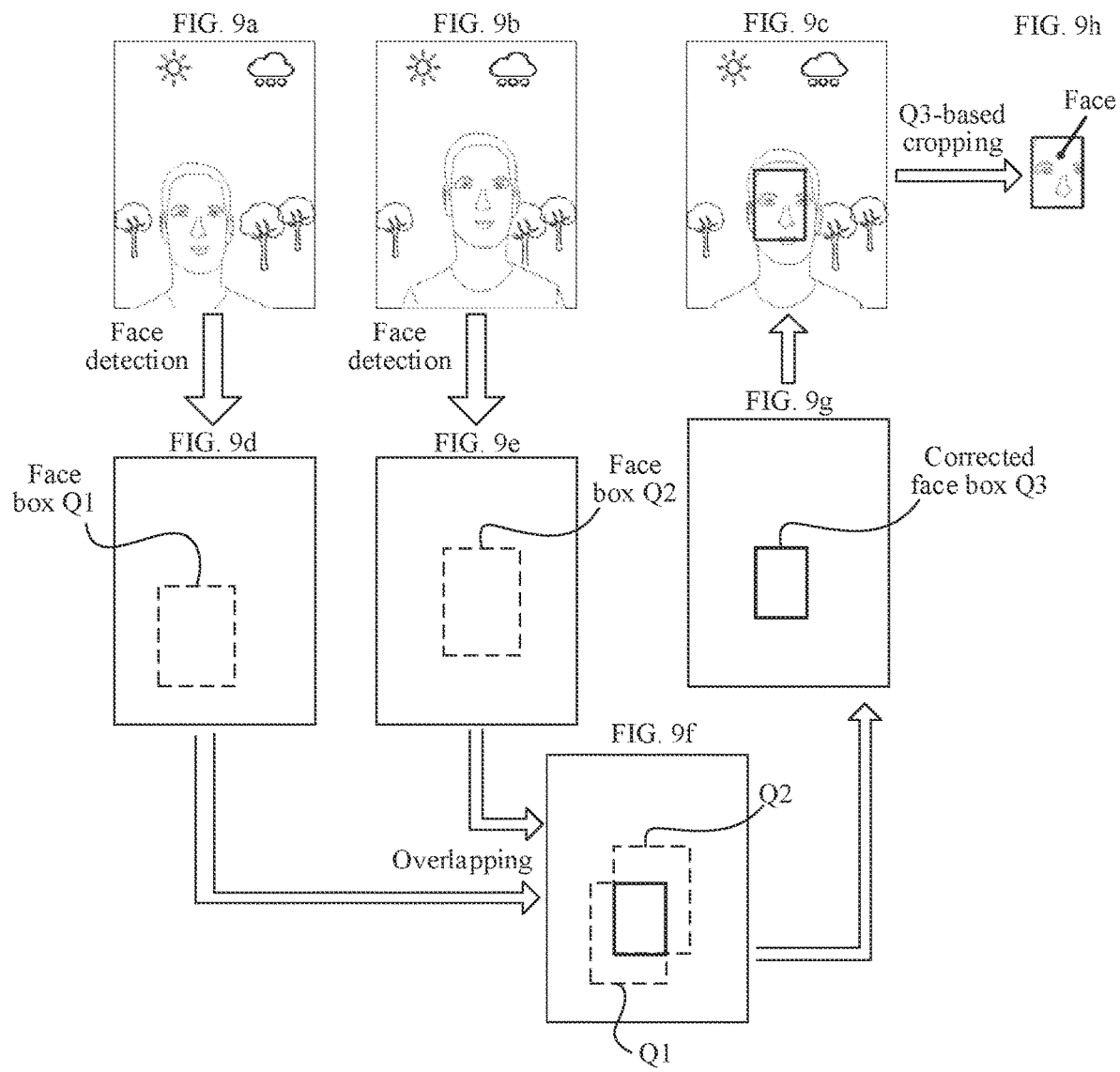
FIG. 9 is an example diagram of another exposure parameter adjustment method disclosed in an embodiment of this application.

Refer to FIG. 9. FIG. 9 is an example of the exposure parameter adjustment method provided in this embodiment. FIG. 9a and FIG. 9b represent the previous two frames of images in step S801. FIG. 9c represents the current-frame image. FIG. 9d is a face box Q1 of FIG. 9a obtained through face detection. FIG. 9e is a face box Q2 of FIG. b obtained through face detection For example, if the current-frame image shown in FIG. 9c is the $N^{th}$ frame of image and N is greater than or equal to 3, FIG. 9a is the $(N-2)^{th}$ frame of image and FIG. 9b is the $(N-1)^{th}$ frame of image.

S802: The automatic exposure module determines an overlapping region of the face boxes of the previous two frames of images as a corrected face box.

For a method for determining the overlapping region of the face boxes of the previous two frames of images by the automatic exposure module, refer to the method described in step S602 of the embodiment shown in FIG. 6.

Refer to FIG. 9f and FIG. 9g. After obtaining the face boxes of the previous two frames of images, the automatic exposure module determines, based on the method described in step S602, an overlapping region of the face box Q1 and the face box Q2 shown in FIG. 9f, and determines the overlapping region as a corrected face box Q3 shown in FIG. 9g.

S803: The automatic exposure module crops the current-frame image by using the corrected face box to obtain a face image of the current-frame image.

Refer to FIG. 9h. FIG. 9h is a face image obtained by the automatic exposure module by cropping the current-frame image in FIG. 9c by using the corrected face box shown in FIG. 9g.

S804: The automatic exposure module adjusts an exposure parameter based on the face image of the current-frame image.

For a specific execution process of steps S803 and S804, refer to steps S404 and S405 in the embodiment shown in FIG. 4. Details are not described herein again.

The method for correcting a face box provided in this embodiment and the method for correcting a face box based on a specific proportional coefficient provided in the foregoing embodiment have consistent beneficial effects.

In some possible embodiments, before using the face boxes of the previous two frames to calculate the overlapping region, the automatic exposure module first obtains posture data of the electronic device when the previous two frames of images are being shot, and calculates, based on the posture data corresponding to the previous two frames of images, a posture change amplitude of the electronic device between the previous two frames of images. If the posture change amplitude is less than or equal to a preset change amplitude threshold, the automatic exposure module continues to use the face boxes of the previous two frames to calculate the overlapping region, or if the posture change amplitude is greater than the change amplitude threshold, skips calculating the overlapping region. When the posture change amplitude is greater than the change amplitude threshold, the automatic exposure module may directly use a face box of a previous frame to crop a current frame, or may correct the face box of the previous frame based on a preset proportional coefficient and crop the current frame by using a face box obtained after being corrected based on the proportional coefficient.

The example shown in FIG. 9 is still used. Before using the face boxes shown in FIG. 9d and FIG. 9e to calculate the overlapping region, the automatic exposure module first calculates, according to the foregoing method for calculating a posture change amplitude, a posture change amplitude of the electronic device that is in a time period from a moment of shooting the image shown in FIG. 9a to a moment of shooting the image shown in FIG. 9b. If the posture change amplitude is less than or equal to the preset change amplitude threshold, the automatic exposure module determines the corrected face box shown in FIG. 9h based on the face boxes shown in FIG. 9d and FIG. 9e. If the posture change amplitude is greater than the change amplitude threshold, the automatic exposure module directly uses the face box shown in FIG. 9e to crop the image shown in FIG. 9c, or may correct the face box shown in FIG. 9e based on the preset proportional coefficient and crop the image shown in FIG. 9c by using the face box obtained after being corrected based on the proportional coefficient.

Embodiment 3

Figure 10:
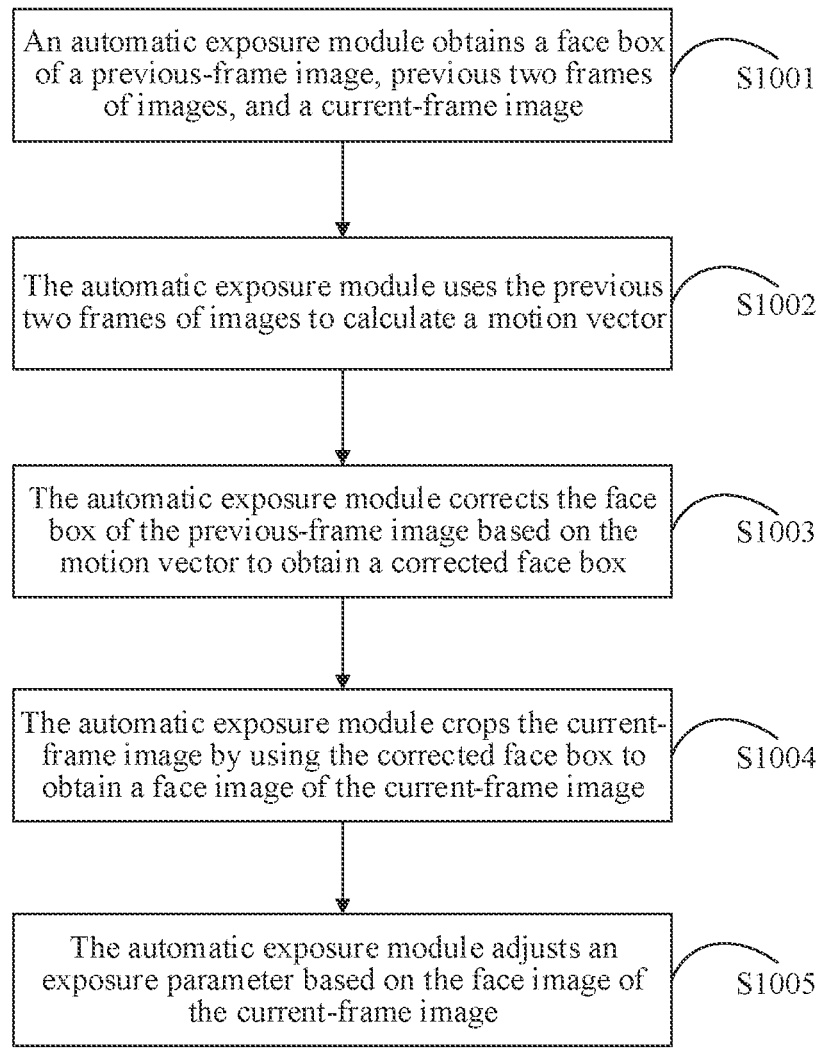
FIG. 10 is a flowchart of still another exposure parameter adjustment method disclosed in an embodiment of this application.

Another embodiment of this application provides an exposure parameter adjustment method. Refer to FIG. 10. The exposure parameter adjustment method provided in this embodiment may include the following steps.

S1001: An automatic exposure module obtains a face box of a previous-frame image, previous two frames of images, and a current-frame image.

In a specific implementation, after a camera starts to shoot images, the automatic exposure module reads a first-frame image from a memory, adjusts an exposure parameter based on the first-frame image, and finally uses a face detection module to identify a face box of the first-frame image.

The automatic exposure module reads a second-frame image from the memory, corrects the face box of the first frame based on a preset proportional coefficient to obtain a corrected face box of the first frame, uses the corrected face box of the first frame to crop the second-frame image to obtain a face image of the second-frame image, adjusts an exposure parameter based on the face image of the second-frame image, and finally uses the face detection module to identify a face box of the second-frame image.

After that, starting from a third frame, each time after reading a frame of image from the memory, the automatic exposure module reads the previous two frames of images from the memory, and reads the face box of the previous-frame image from the memory.

Figure 11:
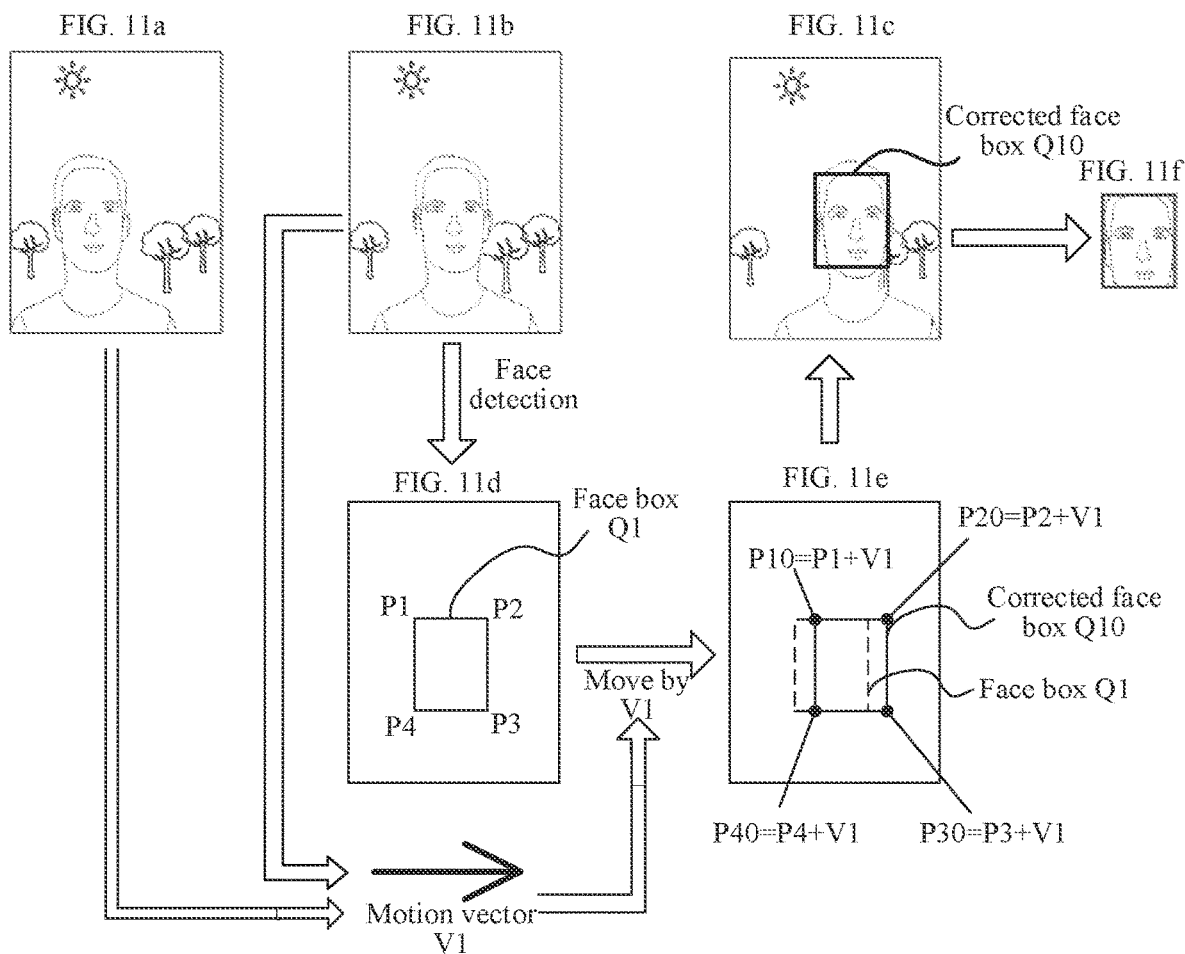
FIG. 11 is an example diagram of still another exposure parameter adjustment method disclosed in an embodiment of this application.

Refer to FIG. 11. FIG. 11a and FIG. 11b represent the previous two frames of images. FIG. 11c represents the current-frame image. FIG. 11d represents a face box Q1 of FIG. 11b obtained after face detection, and vertices of the face box Q1 include P1 to P4. The face box Q1 may be represented by using the following coordinate data:

P1(X1, Y1), P2(X2, Y1), P3(X2, Y2), and P4(X1, Y2).

For example, FIG. 11c may be the $(K+1)^{th}$ frame of image, FIG. 11a is the $(K-1)^{th}$ frame of image, FIG. 11b is the $K^{th}$ frame of image, and FIG. 11d represents a face box of the $K^{th}$ frame of image obtained after face detection. K is greater than or equal to 2.

S1002: The automatic exposure module uses the previous two frames of images to calculate a motion vector.

For a specific implementation of calculating the motion vector by using the previous two frames of images, refer to an embodiment shown in FIG. 12 below.

Refer to FIG. 11. FIG. 11 is an example of the exposure parameter adjustment method in this embodiment. After obtaining the two frames of images shown in FIG. 11a and FIG. 11b, the automatic exposure module uses FIG. 11a and FIG. 11b to calculate a motion vector V1 shown in FIG. 11.

S1003: The automatic exposure module corrects the face box of the previous-frame image based on the motion vector to obtain a corrected face box.

When performing step S1003, for each piece of coordinate data corresponding to the face box of the previous-frame image, the automatic exposure module may add up this coordinate data and the motion vector to obtain a piece of updated coordinate data. After each piece of coordinate data of the face box of the previous-frame image is updated, a polygonal frame represented by obtained pieces of updated coordinate data is a face box obtained through correction based on the motion vector.

Refer to FIG. 11. Based on coordinate data of the face box shown in FIG. 11d: P1(X1, Y1), P2(X2, Y1), P3(X2, Y2), P4(X1, Y2), the automatic exposure module adds up P1 and the motion vector V1 to obtain updated coordinate data P10, the automatic exposure module adds up P2 and the motion vector V1 to obtain updated coordinate data P20, the automatic exposure module adds up P3 and the motion vector V1 to obtain updated coordinate data P30, and the automatic exposure module adds up P4 and the motion vector V1 to obtain updated coordinate data P40. Based on the updated coordinate data P10 to P40, a corrected face box Q10 shown in FIG. 11e can be determined.

For example, if the motion vector V1 is denoted as V1(Vx1, Vy1), the updated coordinate data is as follows:
P10(X1+Vx1, Y1+Vy1), P20(X2+Vx1, Y1+Vy1),
P30(X2+Vx1, Y2+Vy1), P40(X1+Vx1, Y2+Vy1).

It can be seen from FIG. 11e that step S1003 is equivalent to translating the face box of the previous-frame image based on the calculated motion vector. A direction of the translation is a direction of the motion vector, a distance of the translation is a length of the motion vector, and a face box obtained after the translation is a corrected face box.

S1004: The automatic exposure module crops the current-frame image by using the corrected face box to obtain a face image of the current-frame image.

The foregoing example is still used. After obtaining the corrected face box Q10 shown in FIG. 11e, the automatic exposure module crops the current-frame image shown in FIG. 11c by using the corrected face box Q10, to obtain a face image of the current-frame image shown in FIG. 11f.

S1005: The automatic exposure module adjusts an exposure parameter based on the face image of the current-frame image.

For a specific execution process of steps S1004 and S1005, refer to steps S404 and S405 in the embodiment shown in FIG. 4. Details are not described herein again.

The exposure parameter adjustment method provided in this embodiment has the following advantages:

The automatic exposure module can adjust each piece of coordinate data included in the face box based on the motion vector. The method for correcting a face box in Embodiment 3 can be used to correct a face box whose shape is a rectangle, and can also be used to correct a face box whose shape is another shape different from a rectangular. Therefore, according to the exposure parameter adjustment method provided in Embodiment 3, an exposure parameter can be adjusted by using a face box of any shape, which has a wider scope of application.

In addition, because the motion vector reflects a moving direction and distance of a face in the current-frame image relative to a face in the previous-frame image, correcting the face box based on the motion vector can obtain a corrected face box that matches a position of the face in the current-frame image, and a proportion of a background part in the cropped face image can be reduced without reducing the face box. A face image with a larger area can be obtained, and further, pixels of the background part can be prevented from being included in the face image, so that face brightness calculated based on the face image is more accurate, and further, a more accurate exposure parameter can be obtained during exposure parameter adjustment based on the face brightness.

In some possible implementations, when correcting the face box based on motion estimation, the automatic exposure module may not be limited to calculating the motion vector by using the previous two frames of images, but may use images shot earlier to calculate the motion vector.

The foregoing example is still used. When needing to correct a face box of the $K^{th}$ frame, the automatic exposure module may also use the $K^{th}$ frame of image and the $(K-2)^{th}$ frame of image to calculate the motion vector.

In some possible implementations, the automatic exposure module may choose whether to calculate the motion vector based on a posture change amplitude of an electronic device. Each time before using the previous two frames of images to calculate the motion vector, the automatic exposure module first uses posture data of the electronic device when the previous two frames of images are being shot to calculate a posture change amplitude of the electronic device that is in a time period of shooting the previous two frames of images. If the posture change amplitude is greater than a change amplitude threshold, the automatic exposure module skips calculating the motion vector, or if the posture change amplitude is less than or equal to the change amplitude threshold, the automatic exposure module continues to calculate the motion vector according to the method in the previous embodiment.

When the automatic exposure module skips calculating the motion vector because the posture change amplitude is greater than the change amplitude threshold, the automatic exposure module may correct the face box of the previous frame based on a preset proportional coefficient and crop the current frame by using a corrected face box obtained through correction based on the proportional coefficient.

Advantages of choosing whether to calculate the motion vector based on the posture change amplitude are as follows:

If a posture change amplitude of the electronic device between two frames of images is too large, a position of a face changes greatly between the two frames of images, and correspondingly, a motion vector calculated by using the two frames of images cannot accurately reflect a moving direction and distance of the face in the image. Choosing whether to calculate the motion vector based on the posture change amplitude can avoid a calculated motion vector with an excessively large offset, thereby preventing an excessively large offset between the corrected face box and an actual face in the image that is cropped.

Figure 12:
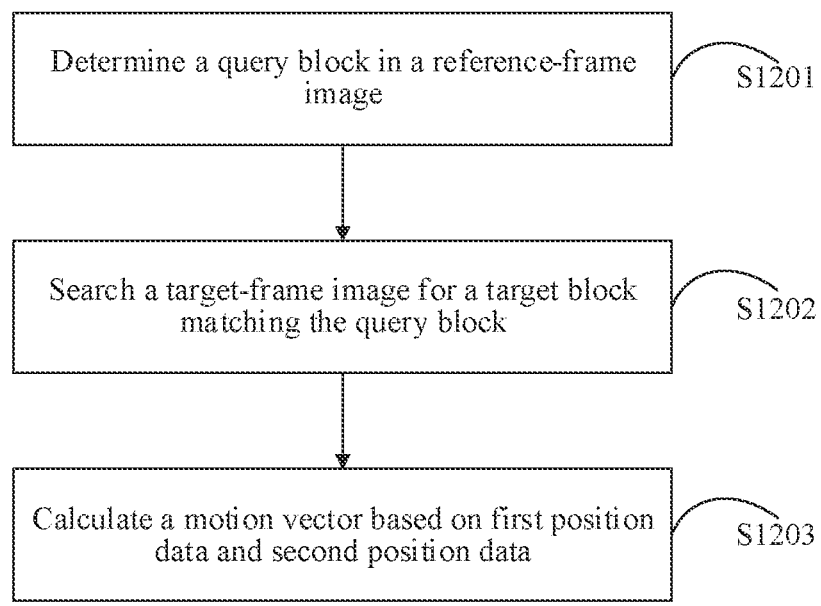
FIG. 12 is a flowchart of a method for calculating a motion vector disclosed in an embodiment of this application.

Refer to FIG. 12. A method for calculating a motion vector by using two frames of images may include the following steps.

S1201: Determine a query block in a reference-frame image.

A shooting time of the reference-frame image is earlier than a shooting time of a target-frame image. In this embodiment, the reference-frame image is an image shot earlier in two frames of images used for calculating a motion vector, and the target-frame image is an image shot later in the two frames of images used for calculating the motion vector.

In S1201, the reference-frame image may be divided into a plurality of image blocks in a specific division manner, and then an automatic exposure module designates one image block in the plurality of image blocks as the query block.

For example, the automatic exposure module may divide the reference-frame image into a plurality of 10×10 image blocks, and then select an image block located in the center of a face box of the reference-frame image from them as the query block.

Figure 13:
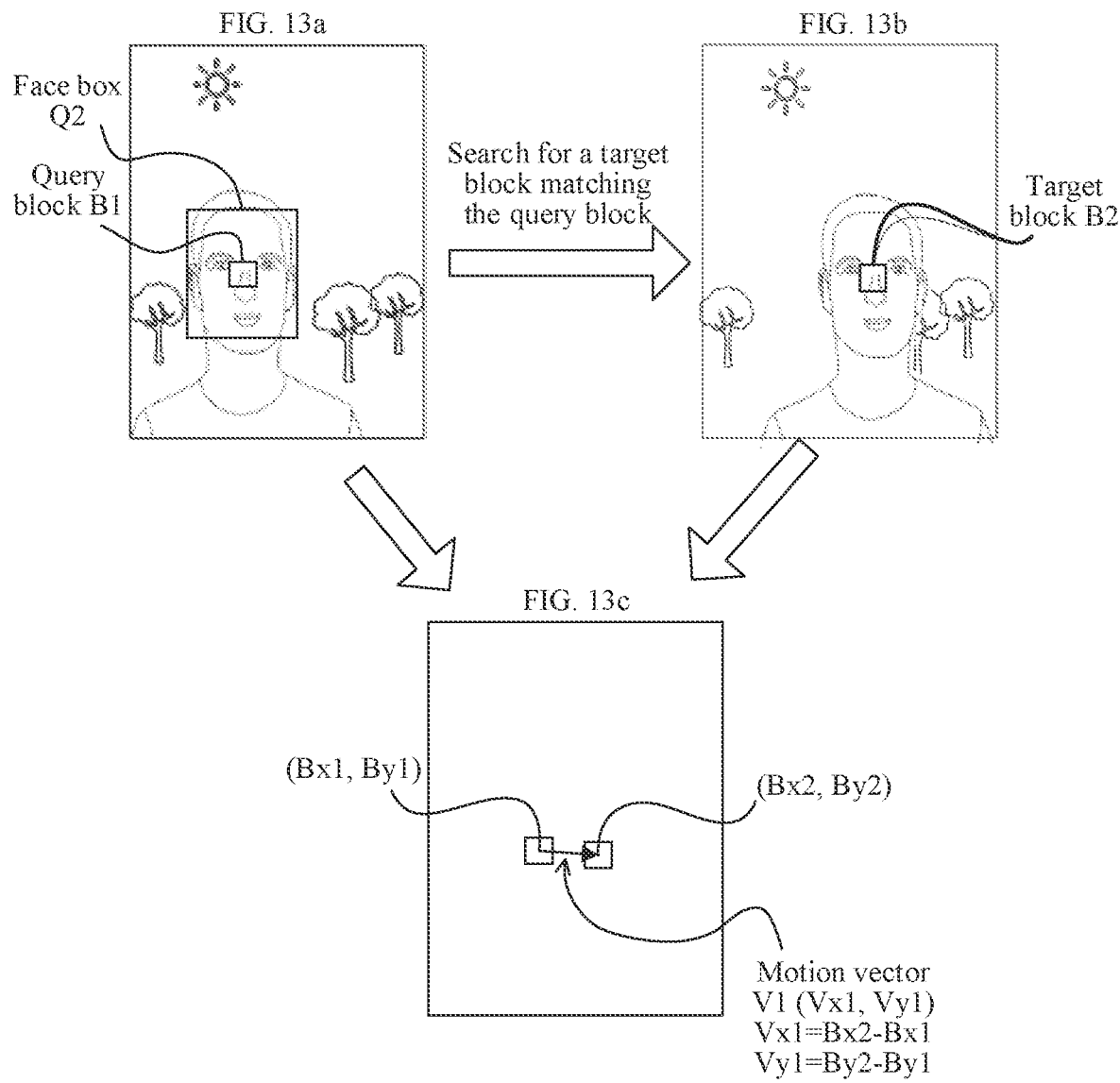
FIG. 13 is an example diagram of a method for calculating a motion vector disclosed in an embodiment of this application.

Refer to FIG. 13. FIG. 13a represents the reference-frame image, and FIG. 13b represents the target-frame image. For example, FIG. 13a may be the $(K-1)^{th}$ frame of image, and FIG. 13b may be the $K^{th}$ frame of image as the target-frame image.

After obtaining a frame of image shown in FIG. 13a, the automatic exposure module reads a face box Q2 of this frame of image from a memory, and selects, based on the face box Q2, an image block B1 located in the center of the face box Q2 from the image shown in FIG. 13a as the query block S1202: Search the target-frame image for a target block matching the query block.

Similar to S1201, in S1202, the target-frame image may also be divided into a plurality of image blocks, and then the automatic exposure module searches the plurality of image blocks in the target-frame image for an image block as the target block. Generally, sizes of image blocks obtained by dividing the target-frame image are the same as those obtained by dividing the reference-frame image. With reference to the foregoing example, the target-frame image may be divided into a plurality of 10×10 image blocks.

A specific implementation of S1202 is as follows:

First, an image block that is in the target-frame image and that has a same position as the query block is selected, and pixel data in the selected image block and pixel data in the query block are used to calculate an offset deviation value between the selected image block and the query block. If the offset value is less than or equal to a preset offset threshold, the currently selected image block is determined as the target block matching the query block. If the offset value is greater than the preset offset threshold, a new image block that has not been selected previously is selected from a plurality of image blocks adjacent to the currently selected image block, to calculate an offset value between the selected new image block and the query block, and so on, until a target block is selected.

In some other optional implementations, the target block may also be defined as an image block that is in the target-frame image and that has a smallest offset value relative to the query block.

In addition to the foregoing search method starting from the position of the query block, there may be another search manner for step S1202. For example, all image blocks of the target-frame image may be searched one by one starting from an upper-left image block of the target-frame image. Details are not described herein again.

The offset value of the two image blocks reflects a degree of content difference between the two image blocks. A smaller offset value indicates that the two image blocks are closer to each other in terms of content.

The offset value between the two image blocks may be a mean absolute difference (MAD) between the two image blocks, or may be a mean squared difference (MSD) between the two image blocks.

A formula for calculating the MAD between the two image blocks is as follows:

$$MAD = \frac{1}{M \times N} \times \sum_{i=1}^{M}\sum_{j=1}^{N}(C_{ij} - R_{ij})$$

A formula for calculating the MSD between the two image blocks is as follows:

$$MSD = \frac{1}{M \times N} \times \sum_{i=1}^{M}\sum_{j=1}^{N}(C_{ij} - R_{ij})^2$$

In the foregoing formulas, represents a grayscale value of a pixel at the $i^{th}$ row and the $j^{th}$ column in an image block, and $R_{ij}$ represents a grayscale value of a pixel at the $i^{th}$ row and the $j^{th}$ column in another image block M represents a quantity of rows of the two image blocks, and N represents a quantity of columns of the two image blocks.

Refer to FIG. 13b. After determining the query block in the reference-frame image shown in FIG. 13a, the automatic exposure module successively calculates an offset value between each image block in the target-frame image shown in FIG. 13b and the query block. It is found through calculation that an offset value between an image block B2 shown in FIG. 13b and the query block is less than or equal to the offset threshold. Therefore, B2 is determined as the target block.

S1203: Calculate a motion vector based on first position data and second position data.

The first position data is coordinate data of a specific point in the query block in the reference-frame image. For example, the first position data may be coordinate data of a center point of the query block in the reference-frame image.

The second position data is coordinate data of a specific point in the target block in the target-frame image. For example, the second position data may be coordinate data of a center point of the target block in the target-frame image.

In a plane image, the motion vector may be represented by a horizontal coordinate difference and a vertical coordinate difference between a start point and an end point of the vector. In step S1203, the start point of the motion vector is a point corresponding to the first position data, and the end point is a point corresponding to the second position data.

Refer to FIG. 13c. After determining the query block B1 and the target block B2, the automatic exposure module determines coordinate data (Bx1, By1) of a center point of the query block B1 as the first position data, determines coordinate data (Bx2, By2) of a center point of the target block B2 as the second position data, and then calculates a motion vector V1(Vx1, Vy1) based on the coordinate data (Bx1, By1) and (Bx2, By2), where Vx1=Bx2−Bx1, and Vy1=By2−By1.

It can be understood that the embodiment shown in FIG. 12 is an optional method for calculating a motion vector by using two frames of images in embodiments of this application. In another possible embodiment of this application, the automatic exposure module may alternatively calculate a motion vector based on a motion estimation method such as a region-matching method or an optical-flow method. The method for calculating a motion vector is not limited in this embodiment of this application.

It should be noted that, in the foregoing Embodiment 1 to Embodiment 3, the exposure parameter adjustment method provided in this application is described by using images shot when a user's face is in a moving state as an example. However, according to the exposure parameter adjustment method provided in the embodiments of this application, an exposure parameter may alternatively be adjusted based on images shot when the user's face is in a static state. The exposure parameter adjustment method provided in the embodiments of this application does not limit whether a face is static or is moving during image shooting.

Embodiment 4

Figure 14:
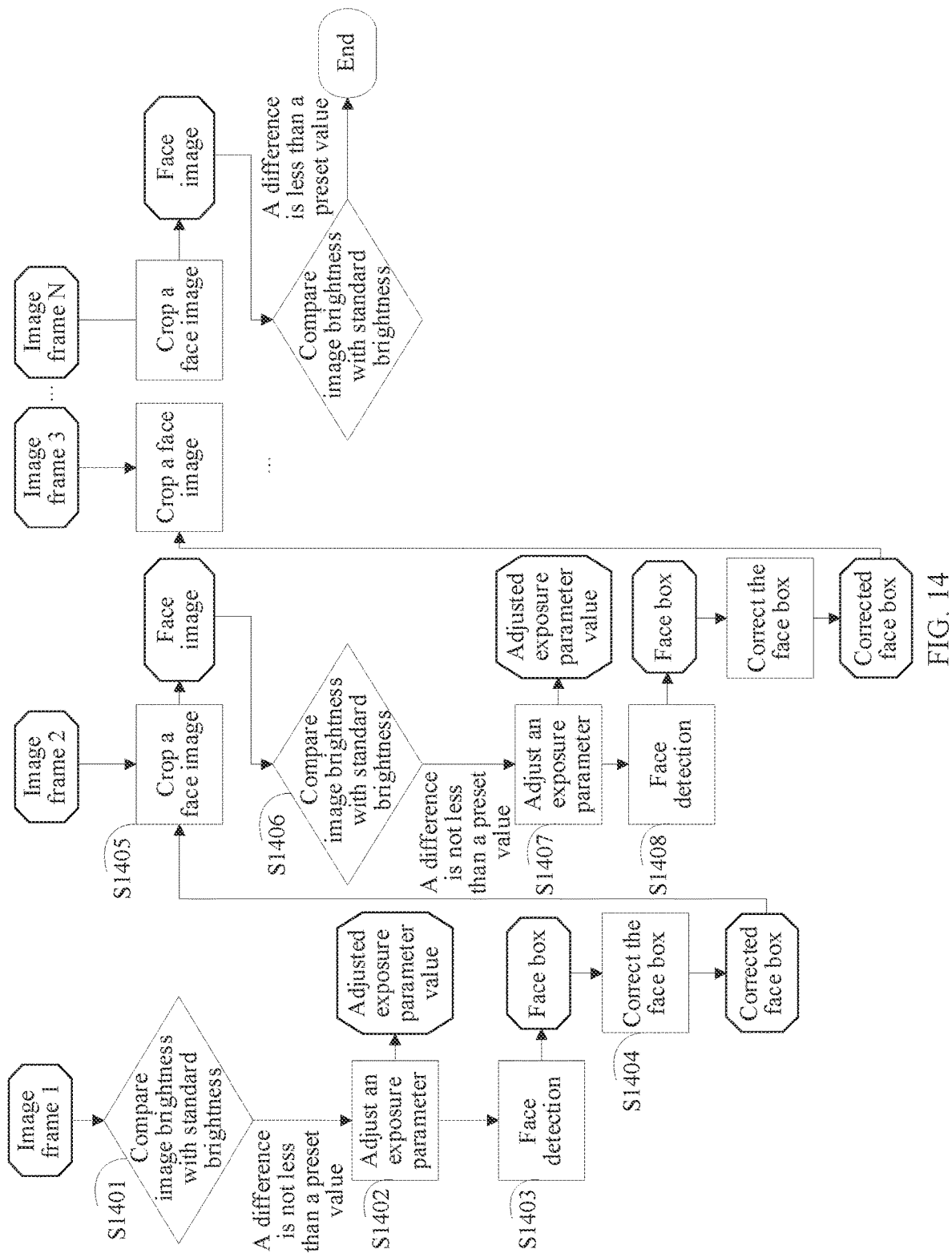
FIG. 14 is a flowchart of yet another exposure parameter adjustment method disclosed in an embodiment of this application.

This embodiment provides an exposure parameter adjustment method. Refer to FIG. 14. The adjustment method may include the following steps.

After being started, a camera consecutively shoots images at a specific interval, and stores each frame of shot image into a memory.

After obtaining an image frame 1, an automatic exposure module performs the following steps S1401 to S1403 for the image frame 1.

S1401: Compare image brightness with standard brightness.

If it is found through comparison that a difference between image brightness of the image frame 1 and the standard brightness is less than a preset value, the method in this embodiment ends, or if it is found through comparison that the difference between the image brightness of the image frame 1 and the standard brightness is not less than the preset value, the automatic exposure module performs steps S1402 and S1403.

S1402: Adjust an exposure parameter.

S1403: Perform face detection.

After performing face detection on the image frame 1, a face box of the image frame 1 is obtained. The face box of the image frame 1 may be stored in a memory of an electronic device.

For a specific execution process of step S1401 to step S1403, refer to steps S301 to S303 in the embodiment shown in FIG. 3A.

After storing the face box of the image frame 1 into the memory and reading an image frame 2 from the memory, the automatic exposure module performs steps S1404, S1405, S1406, S1407, and S1408 for the image frame 2.

S1404: Correct the face box.

A face box of a previous frame of image of the currently read frame of image is corrected in step S1404. When step S1404 is performed for the image frame 2, the face box of the image frame 1 is corrected. After the correction, the automatic exposure module obtains a corrected face box.

For a specific implementation of step S1404, refer to related steps of obtaining a corrected face box in Embodiment 1 to Embodiment 3. Details are not described herein again.

S1405: Crop a face image.

In this embodiment, the automatic exposure module crops the face image by using the corrected face box obtained in step S1404.

S1406: Compare face brightness with the standard brightness.

For a specific execution process of steps S1405 and S1406, refer to steps 304 and 305 in the embodiment shown in FIG. 3A. Details are not described herein again.

After step S1406 is performed, if a difference between the face brightness and the standard brightness is less than the preset value, the method ends, or if the difference between the face brightness and the standard brightness is not less than the preset value, step S1407 is performed.

In this embodiment, a difference between face brightness of the image frame 2 and the standard brightness is not less than the preset value, and therefore step S1407 is performed.

S1407: Adjust the exposure parameter.

In step S1407, the automatic exposure module adjusts the exposure parameter based on the difference between the face brightness of the image frame 2 and the standard brightness, to obtain an adjusted exposure parameter value. For a specific execution process of step S1407, refer to the foregoing exposure parameter adjustment process.

Similar to S1402, the adjusted exposure parameter value obtained in S1407 is sent to a camera driver, and the camera driver configures the camera to shoot one or more image frames based on the adjusted exposure parameter value obtained in step S1407.

For example, when the adjusted exposure parameter value obtained in S1407 is sent to the camera driver, the camera is ready to shoot an image frame 5. Then the camera driver configures the camera to shoot the image frame 5 based on the adjusted exposure parameter value obtained in step S1407.

S1408: Perform face detection.

As shown in FIG. 14, starting from the image frame 2, each time the automatic exposure module obtains an image frame, it corrects a face box of a previous image frame to obtain a corrected face box, and then uses the corrected face box to crop this image frame to obtain a face image of this image frame, and then face brightness of this image frame is determined based on a face image of this image frame. After that, if a compared difference between the face brightness of this image frame and the standard brightness is less than the preset value, the method ends. If the compared difference between the face brightness of the image frame and the standard brightness is not less than the preset value, the exposure parameter is adjusted by using the face image of this image frame, face detection is performed on this image frame to obtain the face box of this image frame after the exposure parameter is adjusted, and so on, until a difference between face brightness of a specific image frame and the standard brightness is less than the preset value.

After a compared difference between face brightness of a specific image frame and the standard brightness is less than the preset value, the automatic exposure module may send, to the camera driver, an exposure parameter used by the camera when shooting this image frame, so that the camera driver configures the camera to continue to shoot images based on the exposure parameter of this image frame.

After an image frame N, if the automatic exposure module finds that a difference between face brightness of a specific image frame and the standard brightness is not greater than the preset value, the automatic exposure module repeats the foregoing process to continue exposure parameter adjustment.

The image frame 1 shown in FIG. 14 includes but is not limited to the first-frame image shot after the camera is started.

In some possible embodiments, if a corresponding face box is not obtained after a specific frame of image is processed by a face detection module, the automatic exposure module may consider the first-frame image after this frame of image as the image frame 1, and continue the process shown in FIG. 14. A reason why a corresponding face box is not obtained after a specific frame of image is processed by the face detection module may be: this frame of image does not include a face, or an image of the face is too blurry to be detected, or the image of the face is incomplete (for example, only a side face is shot), or the like.

For example, if a corresponding face box is not obtained after the $X^{th}$ frame of image is processed by the face detection module, the automatic exposure module may consider the subsequent $(X+1)^{th}$ frame of image as the image frame 1, and continue the process shown in FIG. 14.

In some possible embodiments, after the automatic exposure module ends the process shown in FIG. 14, if it is determined that a difference between image brightness of a specific frame of image and the standard brightness is not less than the preset value, the automatic exposure module may determine this frame of image as the image frame 1, and perform the process shown in FIG. 14 again.

The exposure parameter adjustment method provided in this embodiment has the following beneficial effects:

By correcting a face box of a previous frame, a corrected face box that is closer to a face in a current frame of image can be obtained, to reduce a proportion of a background part in cropped face image data, and improve accuracy of calculated face brightness, so that an adjusted exposure parameter value determined based on the face brightness is more accurate.

It should be noted that, the exposure parameter adjustment method provided in Embodiment 1 of this application may be applied not only to the foregoing scenario in which the electronic device detects that a user is staring at the display for a long time, but also to another scenario in which an exposure parameter needs to be adjusted. A scenario for exposure parameter adjustment is not limited in this embodiment of this application.

An embodiment of this application further provides a computer storage medium, configured to store a computer program. When the computer program is executed, the exposure parameter adjustment method provided in any embodiment of this application is specifically implemented.

An embodiment of this application further provides a computer program product, including a plurality of executable computer commands. When the computer commands of the product are executed, the exposure parameter adjustment method provided in any embodiment of this application is specifically implemented.

What is claimed is:

1. An exposure parameter adjustment method, comprising:
    obtaining a first-frame image and a first-face box, wherein the first-face box is used to indicate a region of a face in the first-frame image;
    obtaining a face image of a second-frame image based on a second-face box, wherein the second-frame image is a next-frame image of the first-frame image, wherein the second-face box is obtained based on the first-face box, and wherein a ratio of a size of the second-face box to a size of the first-face box is a preset proportional coefficient; and
    adjusting an exposure parameter based on the face image of the second-frame image;

wherein the preset proportional coefficient is determined based on N frames of images, and N is greater than or equal to 2;

wherein the N frames of images are consecutive N frames of images shot before the second-frame image; and wherein a posture change amplitude of the first-frame image relative to each of the N frames of images is less than or equal to a preset change amplitude threshold, and the posture change amplitude of the first-frame image relative to one frame of images in the previous N frames of images is obtained through calculation based on posture data of a camera device when the first-frame image is being shot and posture data of the camera device when the frame of images in the previous N frames of images is being shot.

2. The adjustment method according to claim 1, wherein the second-face box is obtained by correcting the first-face box.

3. The adjustment method according to claim 1, further comprising:

cropping the second-frame image based on the second-face box to obtain the face image of the second-frame image.

4. The adjustment method according to claim 3, wherein a proportion of a background part in the face image of the second-frame image is smaller than a proportion of a background part in a comparison face image, wherein the comparison face image is an image obtained by cropping the second-frame image based on the first-face box.

5. The adjustment method according to claim 3, wherein a size of the second-face box is less than a size of the first-face box.

6. The adjustment method according to claim 3, wherein a position of a center point of the second-face box is the same as a position of a center point of the first-face box.

7. The adjustment method according to claim 3, wherein the second-face box is determined based on the first-face box and a face box of a previous-frame image, wherein the face box of the previous-frame image is used to indicate a region of a face in the previous-frame image, and the previous-frame image is a previous-frame image of the first-frame image.

8. The adjustment method according to claim 7, wherein the second-face box is an overlapping region between the first-face box and the face box of the previous-frame image.

9. The adjustment method according to claim 1, wherein an offset between a position of the first-face box and a position of the second-face box matches a motion vector;

wherein the motion vector is determined based on the first-frame image and a previous-frame image, and the previous-frame image is a previous-frame image of the first-frame image; and wherein the posture change amplitude of the first-frame image relative to the previous-frame image is less than the preset change amplitude threshold, and the posture change amplitude of the first-frame image relative to the previous-frame image is obtained through calculation based on the posture data of the camera device when the first-frame image is being shot and the posture data of the camera device when the previous-frame image is being shot.

10. The adjustment method according to claim 9, wherein the motion vector is determined based on a query block and a target block, wherein the query block is any image block obtained by dividing the previous-frame image, and the target block is an image block that is obtained by dividing the first-frame image and that matches the query block.

11. The adjustment method according to claim 10, wherein a start point of the motion vector is a center point of the query block, and an end point of the motion vector is a center point of the target block.

12. The adjustment method according to claim 10, wherein the query block is an image block that is in a plurality of image blocks obtained by dividing the previous-frame image and that is located in the center of a face box of the previous-frame image, and the face box of the previous-frame image is used to indicate a region of a face in the previous-frame image.

13. The adjustment method according to claim 10, wherein the target block is an image block that is in a plurality of image blocks obtained by dividing the first-frame image and whose offset value relative to the query block is less than a preset offset threshold, and the offset value of the image block relative to the query block represents a degree of a difference between the image block and the query block.

14. The adjustment method according to claim 1, wherein the adjusting the exposure parameter based on the face image of the second-frame image comprises:

determining face brightness of the second-frame image based on the face image of the second-frame image; and adjusting the exposure parameter based on the face brightness of the second-frame image.

15. The adjustment method according to claim 1, after the adjusting the exposure parameter based on the face image of the second-frame image, the method further comprises:

controlling a camera to shoot a face image of a user with an exposure parameter adjustment value, wherein the exposure parameter adjustment value is obtained by adjusting exposure parameters according to the face image of the second frame image;

detecting that human eyes are staring at a display of an electronic device; and leaving the display not off.

16. An electronic device, comprising:

a memory configured to store one or more programs; and one or more processors configured to execute the one or more programs, so that the electronic device is enabled to perform operations comprising:

obtaining a first-frame image and a first-face box, wherein the first-face box is used to indicate a region of a face in the first-frame image;

obtaining a face image of a second-frame image based on a second-face box, wherein the second-frame image is a next-frame image of the first-frame image, wherein the second-face box is obtained based on the first-face box, and wherein a ratio of a size of the second-face box to a size of the first-face box is a preset proportional coefficient; and adjusting an exposure parameter based on the face image of the second-frame image;

wherein the preset proportional coefficient is determined based on N frames of images, and N is greater than or equal to 2;

wherein the N frames of images are consecutive N frames of images shot before the second-frame image; and wherein a posture change amplitude of the first-frame image relative to each of the N frames of images is less than or equal to a preset change amplitude threshold, and the posture change amplitude of the first-frame image relative to one frame of images in the previous N frames of images is obtained through calculation based on posture data of a camera device when the first-frame image is being shot and posture data of the camera device when the frame of images in the previous N frames of images is being shot.

17. The electronic device according to claim 16, wherein a size of the second-face box is less than a size of the first-face box.

18. A non-transitory computer-readable storage medium configured to store a computer program, wherein when the computer program is executed, an electronic device is configured to perform operations comprising:
    obtaining a first-frame image and a first-face box, wherein the first-face box is used to indicate a region of a face in the first-frame image;
    obtaining a face image of a second-frame image based on a second-face box, wherein the second-frame image is a next-frame image of the first-frame image, wherein the second-face box is obtained based on the first-face box, and wherein a ratio of a size of the second-face box to a size of the first-face box is a preset proportional coefficient; and
    adjusting an exposure parameter based on the face image of the second-frame image;
    wherein the preset proportional coefficient is determined based on N frames of images, and N is greater than or equal to 2;
    wherein the N frames of images are consecutive N frames of images shot before the second-frame image; and
    wherein a posture change amplitude of the first-frame image relative to each of the N frames of images is less than or equal to a preset change amplitude threshold, and the posture change amplitude of the first-frame image relative to one frame of images in the previous N frames of images is obtained through calculation based on posture data of a camera device when the first-frame image is being shot and posture data of the camera device when the frame of images in the previous N frames of images is being shot.

19. The computer-readable storage medium according to claim 18, wherein a size of the second-face box is less than a size of the first-face box.

* * * * *